US010491730B2

(12) United States Patent
Cha et al.

(10) Patent No.: US 10,491,730 B2
(45) Date of Patent: Nov. 26, 2019

(54) METHOD AND APPARATUS FOR PROVIDING CONTACT INFORMATION

(71) Applicant: Samsung Electronics Co., Ltd., Suwon-si, Gyeonggi-do (KR)

(72) Inventors: Soonhyun Cha, Anyang-si (KR); Sunmin Hwang, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 56 days.

(21) Appl. No.: 15/337,471

(22) Filed: Oct. 28, 2016

(65) Prior Publication Data
US 2017/0126872 A1  May 4, 2017

(30) Foreign Application Priority Data

Oct. 29, 2015 (KR) .................. 10-2015-0151374

(51) Int. Cl.
*H04M 1/2745* (2006.01)
*H04M 3/42* (2006.01)
*H04W 8/18* (2009.01)
*H04M 3/493* (2006.01)

(52) U.S. Cl.
CPC ........... *H04M 1/274508* (2013.01); *H04M 1/274516* (2013.01); *H04M 1/274558* (2013.01); *H04M 3/42059* (2013.01); *H04M 3/4931* (2013.01); *H04W 8/183* (2013.01); *H04M 2201/22* (2013.01); *H04M 2203/554* (2013.01)

(58) Field of Classification Search
CPC . G06F 3/0482; G06F 3/04842; H04L 67/306; H04M 3/5175; H04M 2215/0108; H04M 1/274533; H04M 3/5158

USPC ..... 455/414.1–417; 379/88.1, 93.23, 221.14, 379/355.02–355.1
See application file for complete search history.

(56) References Cited

U.S. PATENT DOCUMENTS

| 8,666,370 | B2 | 3/2014 | Park | |
|---|---|---|---|---|
| 2006/0229063 | A1* | 10/2006 | Koch | H04M 1/274516 455/414.1 |
| 2009/0029674 | A1* | 1/2009 | Brezina | H04M 15/00 455/405 |
| 2009/0150488 | A1* | 6/2009 | Martin-Cocher | H04L 29/12047 709/204 |
| 2010/0303220 | A1* | 12/2010 | Brooks | H04M 3/46 379/142.05 |
| 2016/0063054 | A1* | 3/2016 | Thompson | G06Q 30/0203 705/7.32 |

FOREIGN PATENT DOCUMENTS

| KR | 10-2010-0081022 A | 7/2010 |
|---|---|---|
| KR | 10-2011-0038491 A | 4/2011 |
| KR | 10-2014-0080137 A | 6/2014 |

\* cited by examiner

*Primary Examiner* — Allahyar Kasraian
(74) *Attorney, Agent, or Firm* — Jefferson IP Law, LLP

(57) ABSTRACT

An electronic device having a call handling function and operation method therefor are provided. The electronic device may include a display, a memory configured to store first contact information of a counterpart, a transceiver, and at least one processor. The at least one processor may be configured to control for sending a request for first contact information of the counterpart through the transceiver to an external electronic device in response to a user request, receiving second contact information of the counterpart through the transceiver from the external electronic device, and presenting the first contact information and second contact information on the display.

14 Claims, 15 Drawing Sheets

FIG. 11
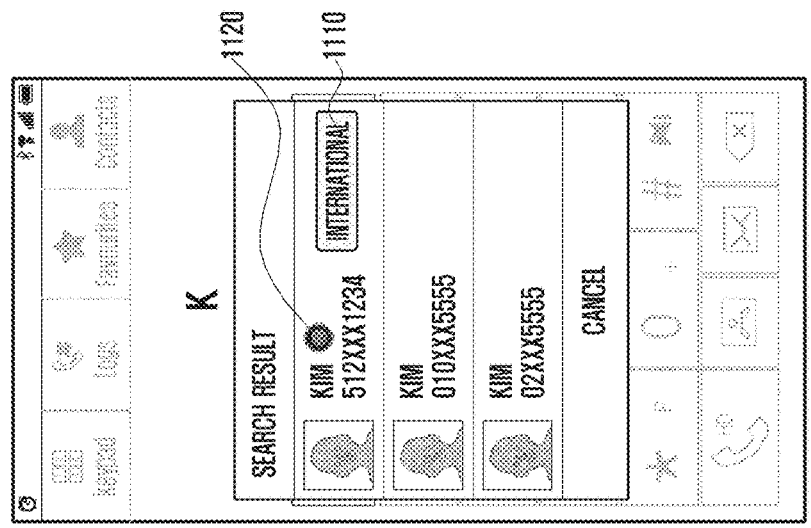
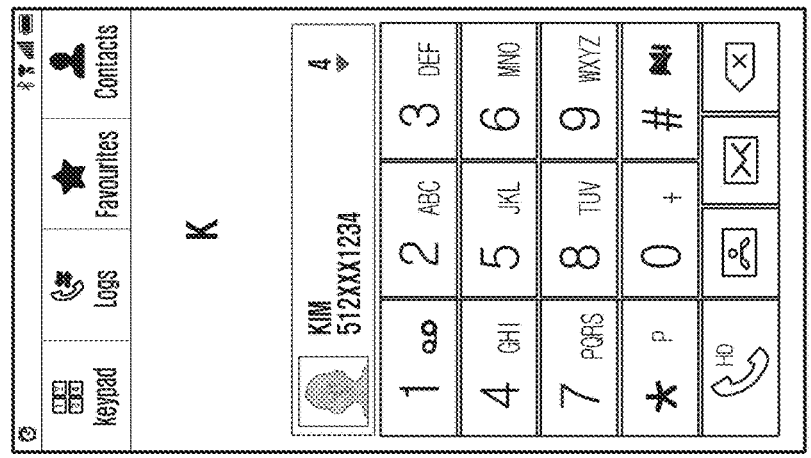
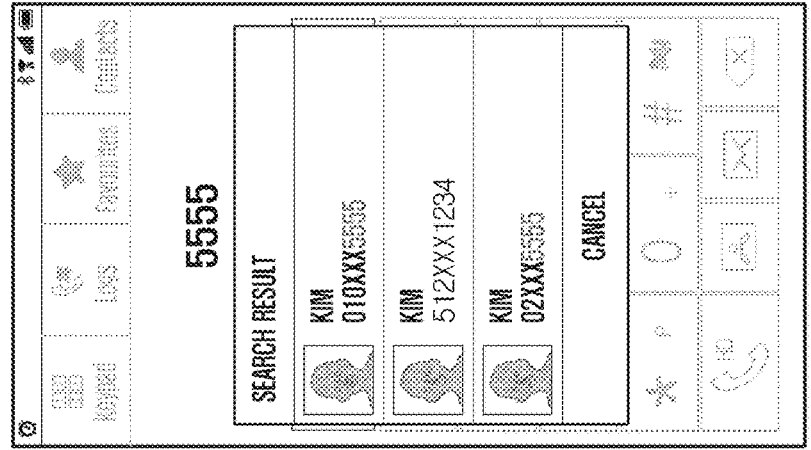

METHOD AND APPARATUS FOR PROVIDING CONTACT INFORMATION

CROSS-REFERENCE TO RELATED APPLICATION(S)

This application claims the benefit under 35 U.S.C. § 119(a) of a Korean patent application filed on Oct. 29, 2015 in the Korean Intellectual Property Office and assigned Serial number 10-2015-0151374, the entire disclosure of which is hereby incorporated by reference.

TECHNICAL FIELD

The present disclosure relates to an electronic device having a call handling function and operation method therefor.

BACKGROUND

With advances in information and communication technologies and semiconductor technologies, electronic devices such as smartphones have become a necessity of modern life. A smartphone may have a subscriber identity card (e.g. universal integrated circuit card (UICC)) to provide call and Internet access services.

The subscriber identity card is a smart card installed in a smartphone, and may store authentication information for network access, a phonebook, and personal information such as short message service (SMS) text messages.

The subscriber identity card may authenticate the subscriber and generate a traffic security key when access is made to a mobile communication network such as global system for mobile communication (GSM), wideband code division multiple access (WCDMA) or long-term evolution (LTE), thereby enabling safe use of mobile communication.

The subscriber identity card may store a communication application such as subscriber identification module (SIM), universal SIM (USIM) or IP multimedia services identity module (ISIM) according to the type of a mobile communication network to which the subscriber is allowed to connect. In addition, the subscriber identity card may provide a high level security function allowing installation of various applications related to, for example, electronic wallet, ticketing, and electronic passport.

In the related art, subscriber identity cards have been manufactured as a proprietary card for a specific mobile communication operator. As such, subscriber identity cards may be released with pre-stored authentication information (e.g. USIM application, international mobile subscriber identity (IMSI), and K value) for access to the network owned by the mobile communication operator. The manufactured subscriber identity cards are supplied to the mobile communication operator, which then sells the subscriber identity cards to individual subscribers. If necessary for a specific subscriber identity card, through over-the-air (OTA) technology, applications may be installed in the subscriber identity card or existing applications therein may be modified or deleted.

A subscriber having a smartphone in which a subscriber identity card is installed may access the network of the corresponding mobile communication operator to use application services. Thereafter, when a new smartphone is purchased, the subscriber identity card installed in the old smartphone may be moved to the new smartphone, so that the authentication information, mobile phone number, phonebook stored in the subscriber identity card can be used as is in the new smartphone.

Meanwhile, smartphones having multiple subscriber identity cards are commercially available in recent years. Such a smartphone with multiple subscriber identity cards enables selective access to multiple mobile communication networks of different mobile communication operators. Hence, a user carrying a smartphone with multiple subscriber identity cards may have multiple contacts associated respectively with the subscriber identity cards, and may change the current contact by selecting one of the subscriber identity cards if necessary.

However, when a particular user has multiple contacts, other persons wishing to communicate with the user may experience inconvenience because they do not know the contact currently used by the user.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device and operation method therefor wherein, when the contact of a counterpart is changed, the changed information is automatically retrieved from an external electronic device so that the user may utilize a call function for the counterpart.

In accordance with an aspect of the present disclosure, an electronic device is provided. The electronic device may include a display, a memory configured to store first contact information of a counterpart, a communication module/transceiver, and at least one processor. The at least one processor may be configured to control for sending a request for first contact information of the counterpart through the communication module to an external electronic device in response to a user request, receiving second contact information of the counterpart through the communication module/transceiver from the external electronic device, and present the first contact information and second contact information on the display.

In accordance with another aspect of the present disclosure, a method for providing contact information in an electronic device is provided. The method may include storing first contact information of a counterpart in a memory, sending a request for first contact information of the counterpart through a communication module or transceiver to an external electronic device in response to a user request, receiving second contact information of the counterpart through the communication module or transceiver from the external electronic device, and presenting the first contact information and second contact information on a display.

In accordance with another aspect of the present disclosure, a non-transitory computer-readable recording medium having recorded thereon at least one program comprising commands which, when executed by at least one processor, is provided. The instructions may cause a processor of the electronic device to store first contact information of a counterpart in a memory, to send a request for first contact information of the counterpart through a communication module or transceiver to an external electronic device in response to a user request, to receive second contact information of the counterpart through the communication module or transceiver from the external electronic device, and to present the first contact information and the second contact information on a display.

In a feature of the present disclosure, when the user browses the phonebook, the changed contact of a counterpart is displayed in such a manner that it is readily distinguishable from other contacts. Hence, the user may readily identify the current contact for the counterpart.

According to an embodiment of the present disclosure, when contacts are searched for a counterpart, first contact information of the counterpart can be found together with changed second contact information, and the second contact information may be displayed so that it is distinguished from the first contact information. Hence, a user who does not know that the contact of a counterpart is changed, may use the existing phone number to find the current contact of the counterpart.

According to an embodiment of the present disclosure, when a call is placed to a counterpart whose contact is changed, the electronic device may replace the contact selected or entered by the user with the changed contact of the counterpart. Hence, the user, who does not know that the contact of a counterpart is changed, may place a call to the counterpart using the existing phone number.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 11 is screen representations for a contact search in the electronic device according to an embodiment of the present disclosure;

Throughout the drawings, like reference numerals will be understood to refer to like parts, components, and structures.

DETAILED DESCRIPTION

Figure 1:
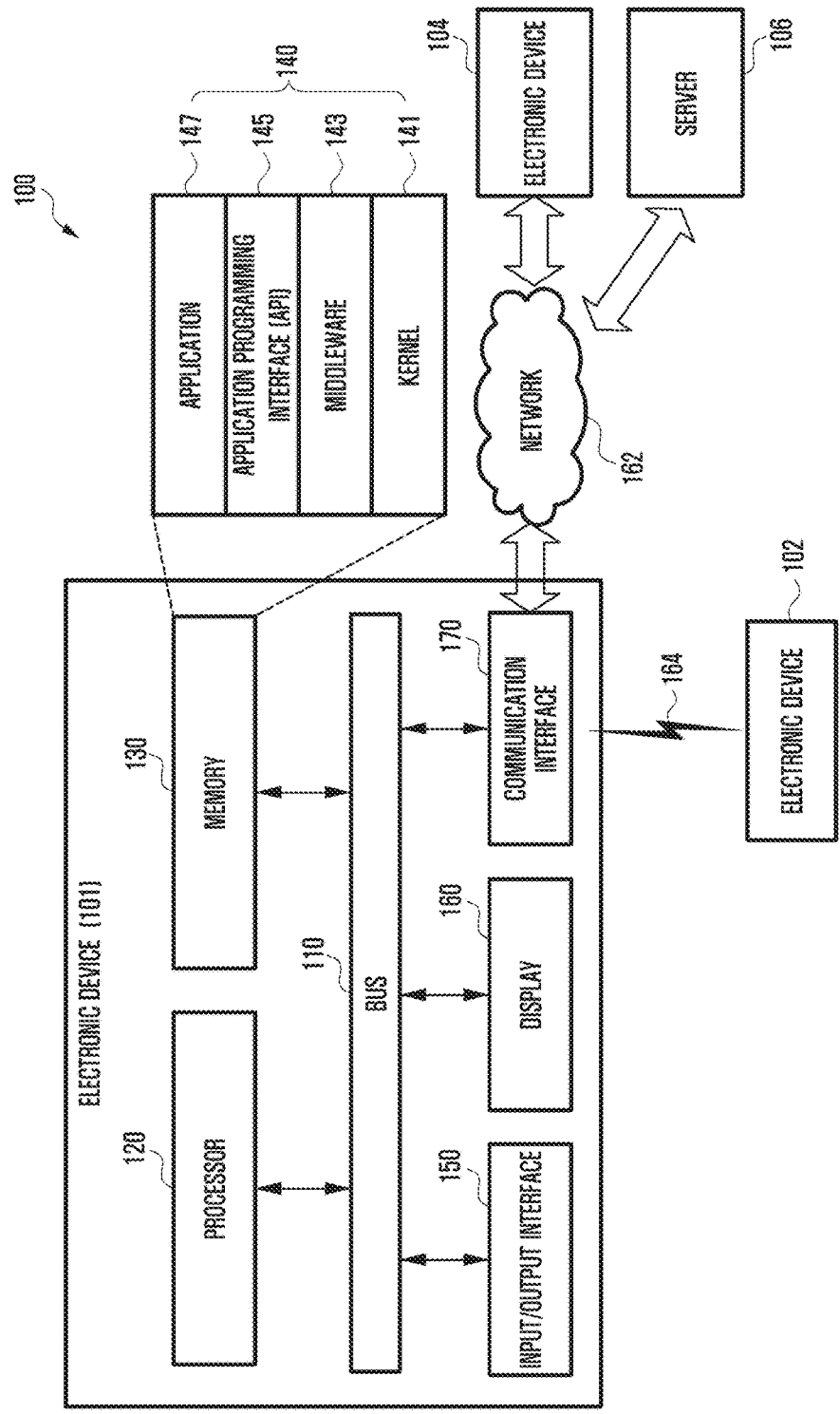
FIG. 1 illustrates a network environment including electronic devices according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The expressions such as "include" and "may include" may denote the presence of the disclosed functions, operations, and constituent elements and do not limit one or more additional functions, operations, and constituent elements. Terms such as "include" and/or "have" may be construed to denote a certain characteristic, number, operation, constituent element, component or a combination thereof, but may not be construed to exclude the existence of or a possibility of addition of one or more other characteristics, numbers, operations, constituent elements, components or combinations thereof.

Furthermore, in the present disclosure, the expression "and/or" includes any and all combinations of the associated listed words. For example, the expression "A and/or B" may include A, may include B, or may include both A and B.

In the present disclosure, expressions including ordinal numbers, such as "first" and "second," etc., may modify various elements. However, such elements are not limited by the above expressions. For example, the above expressions do not limit the sequence and/or importance of the elements. The above expressions are used merely for the purpose to distinguish an element from the other elements. For example, a first user device and a second user device indicate different user devices although both of them are user devices. For example, a first element could be termed a second element, and similarly, a second element could be also termed a first element without departing from the scope of the present disclosure.

In the case where a component is referred to as being "connected" or "accessed" to other component, it should be understood that not only the component is directly connected or accessed to the other component, but also there may exist another component between them. Meanwhile, in the case where a component is referred to as being "directly connected" or "directly accessed" to other component, it should be understood that there is no component therebetween. The terms used in the present disclosure are only used to describe specific various embodiments, and are not intended to limit the present disclosure. As used herein, the singular forms are intended to include the plural forms as well, unless the context clearly indicates otherwise. Singular forms are intended to include plural forms unless the context clearly indicates otherwise.

An electronic device according to the present disclosure may be a device including a communication function. For example, the device corresponds to a combination of at least one of a smartphone, a tablet personal computer (PC), a mobile phone, a video phone, an e-book reader, a desktop PC, a laptop PC, a netbook computer, a personal digital assistant (PDA), a portable multimedia player (PMP), a digital audio player, a mobile medical device, an electronic bracelet, an electronic necklace, an electronic accessory, a camera, a wearable device, an electronic clock, a wrist watch, home appliances (for example, an air-conditioner, vacuum, an oven, a microwave, a washing machine, an air cleaner, and the like), an artificial intelligence robot, a television (TV), a digital versatile disc (DVD) player, an audio device, various medical devices (for example, magnetic resonance angiography (MRA), magnetic resonance imaging (MRI), computed tomography (CT), a scanning machine, a ultrasonic wave device, or the like), a navigation device, a global positioning system (GPS) receiver, an event data recorder (EDR), a flight DR (FDR), a set-top box, a TV box (for example, Samsung HomeSync™, Apple TV™, or Google TV™), an electronic dictionary, vehicle infotainment device, an electronic equipment for a ship (for example, navigation equipment for a ship, gyrocompass, or the like), avionics, a security device, electronic clothes, an electronic key, a camcorder, game consoles, a head-mounted display (HMD), a flat panel display device, an electronic frame, an electronic album, furniture or a portion of a building/structure that includes a communication function, an electronic board, an electronic signature receiving device, a projector, and the like. It is obvious to those skilled in the art that the electronic device according to the present disclosure is not limited to the aforementioned devices.

FIG. 1 is a block diagram illustrating a configuration 100 of an electronic device according to an embodiment of the present disclosure.

Referring to FIG. 1, the electronic device 101 may include a bus 110, a processor 120, a memory 130, a user input module (or input/output interface) 150, a display module (or display) 160, a communication module (or communication interface) 170, and other similar and/or suitable components.

The bus 110 may be a circuit which interconnects the above-described elements and delivers a communication (e.g., a control message) between the above-described elements.

The processor 120 may receive commands from the above-described other elements (e.g., the memory 130, the user input module 150, the display module 160, the communication module 170, etc.) through the bus 110, may interpret the received commands, and may execute calculation or data processing according to the interpreted commands.

The memory 130 may store commands or data received from the processor 120 or other elements (e.g., the user input module 150, the display module 160, the communication module 170, etc.) or generated by the processor 120 or the other elements. The memory 130 may include programming modules 140, such as a kernel 141, middleware 143, an application programming interface (API) 145, an application 147, and the like. Each of the above-described programming modules 140 may be implemented in software, firmware, hardware, or a combination of two or more thereof.

The kernel 141 may control or manage system resources (e.g., the bus 110, the processor 120, the memory 130, etc.) used to execute operations or functions implemented by other programming modules 140 (e.g., the middleware 143, the API 145, and the application 147). Also, the kernel 141 may provide an interface capable of accessing and controlling or managing the individual elements of the electronic device 101 by using the middleware 143, the API 145, or the application 147.

The middleware 143 may serve to go between the API 145 or the application 147 and the kernel 141 in such a manner that the API 145 or the application 147 communicates with the kernel 141 and exchanges data therewith. Also, in relation to work requests received from one or more applications 147 and/or the middleware 143, for example, may perform load balancing of the work requests by using a method of assigning a priority, in which system resources (e.g., the bus 110, the processor 120, the memory 130, etc.) of the electronic device 101 can be used, to at least one of the one or more applications 147.

The API 145 is an interface through which the application 147 is capable of controlling a function provided by the kernel 141 or the middleware 143, and may include, for example, at least one interface or function for file control, window control, image processing, character control, or the like.

The user input module 150, for example, may receive a command or data as input from a user, and may deliver the received command or data to the processor 120 or the memory 130 through the bus 110. The display module 160 may display a video, an image, data, or the like to the user.

The communication module 170 may connect communication between another electronic device 102 and the electronic device 101. The communication module 170 may support a predetermined short-range communication protocol (e.g., Wi-Fi, Bluetooth (BT), and near field communication (NFC)), or predetermined network communication 162 (e.g., the Internet, a local area network (LAN), a wide area network (WAN), a telecommunication network, a cellular network, a satellite network, a plain old telephone service (POTS), or the like). Each of the electronic devices 102 and 104 may be a device which is identical (e.g., of an identical type) to or different (e.g., of a different type) from the electronic device 101. Further, the communication module 170 may connect communication between a server 164 and the electronic device 101 via the network 162.

Figure 2:
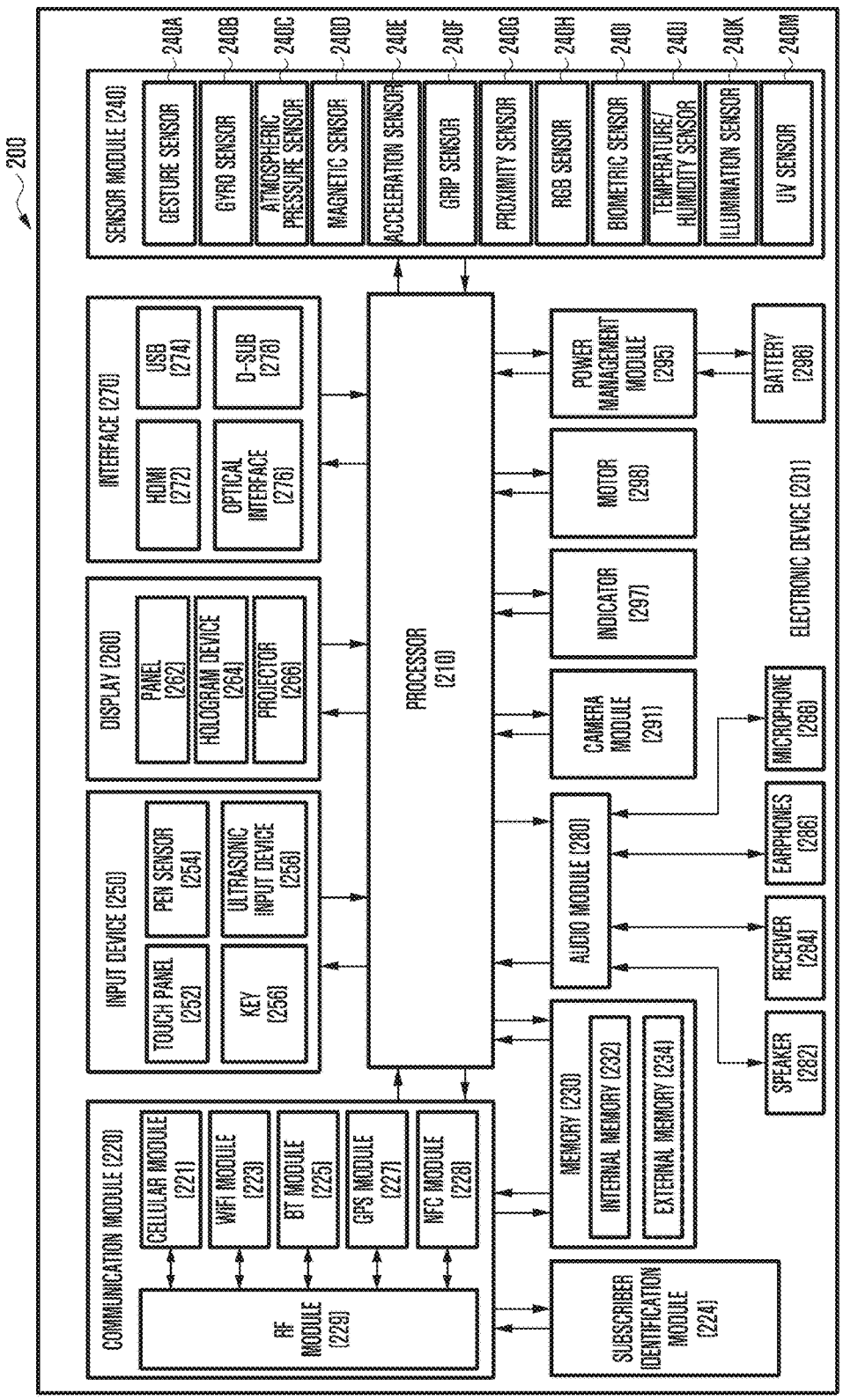
FIG. 2 is a block diagram of an electronic device according to various embodiments of the present disclosure.

FIG. 2 is a block diagram of hardware 200 illustrating a configuration of an electronic device 201 according to an embodiment of the present disclosure.

The hardware 200 may be, for example, the electronic device 101 illustrated in FIG. 1.

Referring to FIG. 2, the electronic device may include one or more processors 210, a communication module 220, a subscriber identification module (SIM) card 224, a memory 230, a sensor module 240, an input device 250, a display module 260, an interface 270, an audio module 280, a camera module 291, a power management module 295, a battery 296, an indicator 297, a motor 298 and any other similar and/or suitable components.

The application processor (AP) 210 (e.g., the processor 120 shown in FIG. 1) may include one or more APs, or one or more communication processors (CPs). The processor 210 may be, for example, the processor 120 illustrated in FIG. 1. The AP 210 is illustrated as being included in the processor 210 in FIG. 2, but may be included in different integrated circuit (IC) packages, respectively. According to an embodiment of the present disclosure, the AP 210 may be included in one IC package.

The AP 210 may execute an operating system (OS) or an application program, and thereby may control multiple hardware or software elements connected to the AP 210 and may perform processing of and arithmetic operations on various data including multimedia data. The AP 210 may be implemented by, for example, a system on chip (SoC). According to an embodiment of the present disclosure, the AP 210 may further include a graphical processing unit (GPU) (not illustrated).

The AP 210 may manage a data line and may convert a communication protocol in the case of communication between the electronic device (e.g., the electronic device 101) including the hardware 200 and different electronic devices connected to the electronic device through the network. The AP 210 may be implemented by, for example, a SoC. According to an embodiment of the present disclosure, the AP 210 may perform at least some of multimedia control functions. The AP 210, for example, may distinguish and authenticate a terminal in a communication network by using a subscriber identification module (e.g., the SIM card 224). Also, the AP 210 may provide the user with services, such as a voice telephony call, a video telephony call, a text message, packet data, and the like.

Further, the AP 210 may control the transmission and reception of data by the communication module 220. In FIG. 2, the elements such as the AP 220, the power management module 295, the memory 230, and the like are illustrated as elements separate from the AP 210. However, according to an embodiment of the present disclosure, the AP 210 may include at least some (e.g., the CP) of the above-described elements.

According to an embodiment of the present disclosure, the AP 210 may load, to a volatile memory, a command or data received from at least one of a non-volatile memory and other elements connected to each of the AP 210, and may process the loaded command or data. Also, the AP 210 may store, in a non-volatile memory, data received from or generated by at least one of the other elements.

The SIM card 224 may be a card implementing a subscriber identification module, and may be inserted into a slot formed in a particular portion of the electronic device 101. The SIM card 224 may include unique identification information (e.g., integrated circuit card identifier (ICCID)) or subscriber information (e.g., International Mobile Subscriber Identity (IMSI)).

The memory 230 may include an internal memory 232 and an external memory 234. The memory 230 may be, for example, the memory 130 illustrated in FIG. 1. The internal memory 232 may include, for example, at least one of a volatile memory (e.g., a dynamic random access memory (DRAM), a static RAM (SRAM), a synchronous DRAM (SDRAM), etc.), and a non-volatile memory (e.g., a one-time programmable read-only memory (OTPROM), a programmable ROM (PROM), an erasable and programmable ROM (EPROM), an electrically erasable and programmable ROM (EEPROM), a mask ROM, a flash ROM, a not AND (NAND) flash memory, a not OR (NOR) flash memory, etc.). According to an embodiment of the present disclosure, the internal memory 232 may be in the form of a solid state drive (SSD). The external memory 234 may further include a flash drive, for example, a compact flash (CF), a secure digital (SD), a micro-SD (Micro-SD), a mini-SD (Mini-SD), an extreme digital (xD), a memory stick, or the like.

The communication module 220 may include a cellular module 221, a wireless communication module 223 or a radio frequency (RF) module 229. The communication module 220 may be, for example, the communication interface 170 illustrated in FIG. 1. The communication module 220 may include, for example, a Wi-Fi part or module 223, a BT part or module 225, a GPS part or module 227, or a NFC part or module 228. For example, the wireless communication module 220 may provide a wireless communication function by using a radio frequency (RF). Additionally or alternatively, the wireless communication module 220 may include a network interface (e.g., a LAN card), a modulator/demodulator (modem), or the like for connecting the hardware 200 to a network (e.g., the Internet, a LAN, a WAN, a telecommunication network, a cellular network, a satellite network, a POTS, or the like).

The RF module 229 may be used for transmission and reception of data, for example, transmission and reception of RF signals or called electronic signals. Although not illustrated, the RF unit 229 may include, for example, a transceiver, a power amplifier module (PAM), a frequency filter, a low noise amplifier (LNA), or the like. Also, the RF module 229 may further include a component for transmitting and receiving electromagnetic waves in a free space in a wireless communication, for example, a conductor, a conductive wire, or the like.

The sensor module 240 may include, for example, at least one of a gesture sensor 240A, a gyro sensor 240B, a barometer (or atmospheric pressure) sensor 240C, a magnetic sensor 240D, an acceleration sensor 240E, a grip sensor 240F, a proximity sensor 240G, a red, green and blue (RGB) sensor 240H, a biometric sensor 240I, a temperature/humidity sensor 240J, an illuminance sensor 240K, and an ultra violet (UV) sensor 240M. The sensor module 240 may measure a physical quantity or may sense an operating state of the electronic device 100, and may convert the measured or sensed information to an electrical signal. Additionally or alternatively, the sensor module 240 may include, for example, an olfactory sensor or electronic nose (E-nose) sensor (not illustrated), an electromyography (EMG) sensor (not illustrated), an electroencephalogram (EEG) sensor (not illustrated), an electrocardiogram (ECG) sensor (not illustrated), a fingerprint sensor (not illustrated), and the like. Additionally or alternatively, the sensor module 240 may include, for example, an E-nose sensor (not illustrated), an EMG sensor (not illustrated), an EEG sensor (not illustrated), an ECG sensor (not illustrated), a fingerprint sensor, and the like. The sensor module 240 may further include a control circuit (not illustrated) for controlling one or more sensors included therein.

The input device 250 may include a touch panel 252, a pen sensor 254 (e.g., a digital pen sensor or digital stylus), keys 256, and an ultrasonic input unit 258. The input device 250 may be, for example, the user input module 150 illustrated in FIG. 1. The touch panel 252 may recognize a touch input in at least one of, for example, a capacitive scheme, a resistive scheme, an infrared scheme, and an acoustic wave scheme. Also, the touch panel 252 may further include a controller (not illustrated). In the capacitive type, the touch panel 252 is capable of recognizing proximity as well as a direct touch. The touch panel 252 may further include a tactile layer (not illustrated). In this event, the touch panel 252 may provide a tactile response to the user.

The pen sensor 254 (e.g., a digital pen sensor or digital stylus), for example, may be implemented by using a method identical or similar to a method of receiving a touch input from the user, or by using a separate sheet for recognition. For example, a key pad or a touch key may be used as the keys 256. The ultrasonic input unit 258 enables the terminal to sense a sound wave by using a microphone (e.g., a microphone 288) of the terminal through a pen generating an ultrasonic signal, and to identify data. The ultrasonic input unit 258 is capable of wireless recognition. According to an embodiment of the present disclosure, the hardware 200 may receive a user input from an external device (e.g., a network, a computer, or a server), which is connected to the communication module 230, through the communication module 230.

The display module 260 may include a panel 262, a hologram 264, or projector 266. The display module 260 may be, for example, the display module 160 illustrated in FIG. 1. The panel 262 may be, for example, a liquid crystal display (LCD) and an active matrix organic light emitting diode (AM-OLED) display or plastic OLED (POLED) display, and the like. The panel 262 may be implemented so as to be, for example, flexible, transparent, or wearable. The panel 262 may include the touch panel 252 and one or more modules. The hologram 264 may display a three-dimensional image in the air by using interference of light. According to an embodiment of the present disclosure, the display module 260 may further include a control circuit for controlling the panel 262 or the hologram 264.

The interface 270 may include, for example, a high-definition multimedia interface (HDMI) 272, a universal serial bus (USB) 274, an optical interface 276, and a D-subminiature (D-sub) 278. Additionally or alternatively, the interface 270 may include, for example, SD/multi-media card (MMC) (not illustrated) or infrared data association (IrDA) (not illustrated).

The audio codec or audio module 280 may bidirectionally convert between a voice and an electrical signal. The audio codec 280 may convert voice information, which is input to or output from the audio codec 280 through, for example, a speaker 282, a receiver 284, an earphone 286, the microphone 288 or the like.

The camera module 291 may capture an image and a moving image. According to an embodiment of the present disclosure, the camera module 291 may include one or more image sensors (e.g., a front lens or a back lens), an image signal processor (ISP) (not illustrated), and a flash LED (not illustrated).

The power management module 295 may manage power of the hardware 200. Although not illustrated, the power management module 295 may include, for example, a power management integrated circuit (PMIC), a charger integrated circuit (IC), or a battery fuel gauge.

The PMIC may be mounted to, for example, an IC or a SoC semiconductor. Charging methods may be classified into a wired charging method and a wireless charging method. The charger IC may charge a battery, and may prevent an overvoltage or an overcurrent from a charger to the battery. According to an embodiment of the present disclosure, the charger IC may include a charger IC for at least one of the wired charging method and the wireless charging method. Examples of the wireless charging method may include a magnetic resonance method, a magnetic induction method, an electromagnetic method, and the like. Additional circuits (e.g., a coil loop, a resonance circuit, a rectifier, etc.) for wireless charging may be added in order to perform the wireless charging.

The battery fuel gauge may measure, for example, a residual quantity of the battery 296, or a voltage, a current or a temperature during the charging. The battery 296 may supply power by generating electricity, and may be, for example, a rechargeable battery.

The indicator 297 may indicate particular states of the hardware 200 or a part (e.g., the AP 211) of the hardware 200, for example, a booting state, a message state, a charging state and the like. The motor 298 may convert an electrical signal into a mechanical vibration. The processor 210 may control the sensor module 240.

Although not illustrated, the hardware 200 may include a processing unit (e.g., a GPU) for supporting a module TV. The processing unit for supporting a module TV may process media data according to standards such as, for example, digital multimedia broadcasting (DMB), digital video broadcasting (DVB), media flow, and the like. Each of the above-described elements of the hardware 200 according to an embodiment of the present disclosure may include one or more components, and the name of the relevant element may change depending on the type of electronic device. The hardware 200 according to an embodiment of the present disclosure may include at least one of the above-described elements. Some of the above-described elements may be omitted from the hardware 200, or the hardware 200 may further include additional elements. Also, some of the elements of the hardware 200 according to an embodiment of the present disclosure may be combined into one entity, which may perform functions identical to those of the relevant elements before the combination.

The term "module" used in the present disclosure may refer to, for example, a unit including one or more combinations of hardware, software, and firmware. The "module" may be interchangeable with a term, such as "unit," "logic," "logical block," "component," "circuit," or the like. The "module" may be a minimum unit of a component formed as one body or a part thereof. The "module" may be a minimum unit for performing one or more functions or a part thereof. The "module" may be implemented mechanically or electronically. For example, the "module" according to an embodiment of the present disclosure may include at least one of an application-specific integrated circuit (ASIC) chip, a field-programmable gate array (FPGA), and a programmable-logic device for performing certain operations which have been known or are to be developed in the future.

Figure 3:
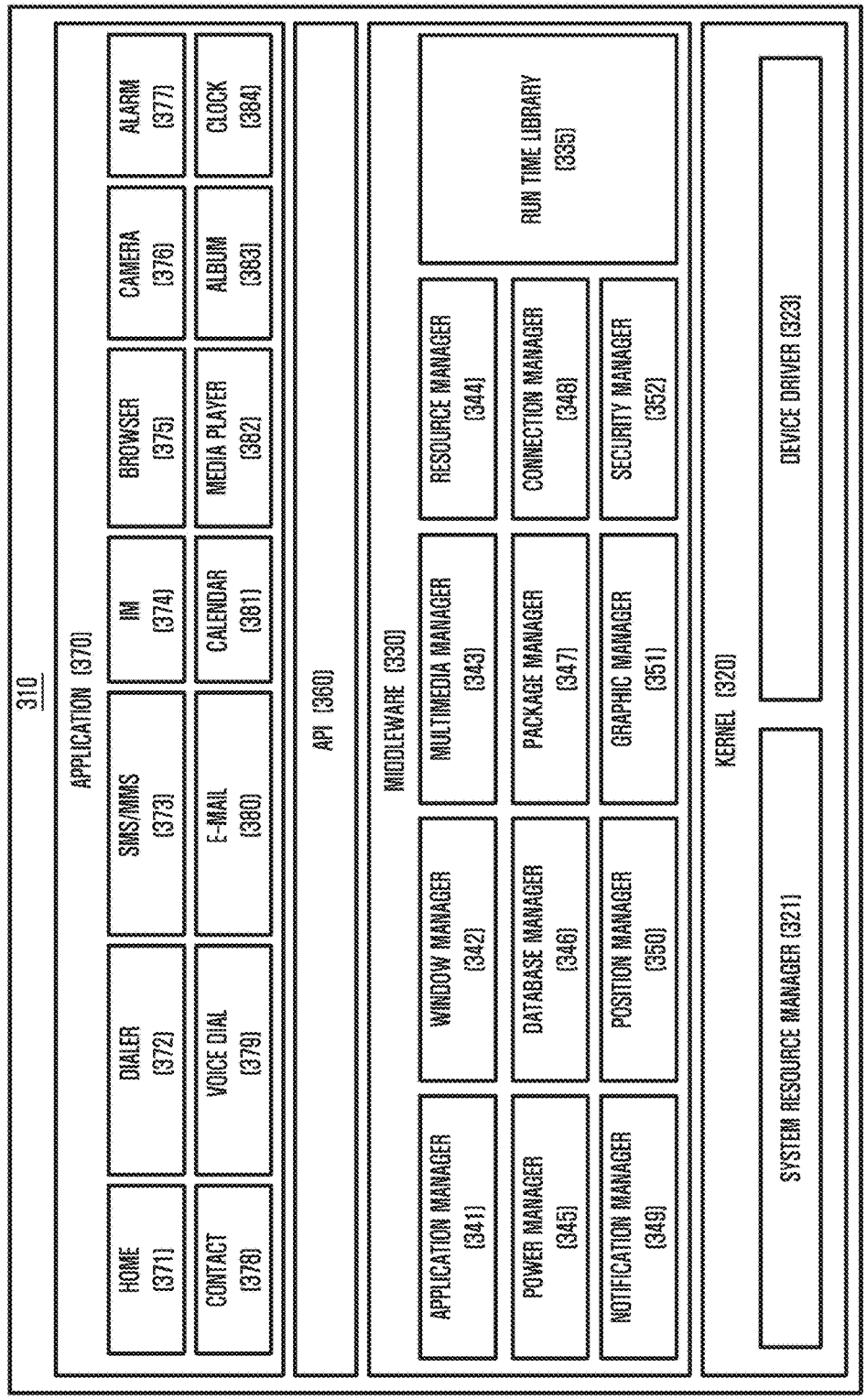
FIG. 3 is a block diagram of a programming module according to various embodiments of the present disclosure.

FIG. 3 is a block diagram illustrating a configuration of a programming module 310 according to an embodiment of the present disclosure.

The programming module 310 may be included (or stored) in the electronic device 101 (e.g., the memory 130 shown in FIG. 1) or may be included (or stored) in the electronic device 201 (e.g., the memory 230 shown in FIG. 2). At least a part of the programming module 310 may be implemented in software, firmware, hardware, or a combination of two or more thereof. The programming module 310 may be implemented in hardware (e.g., the hardware 200), and may include an OS controlling resources related to an electronic device (e.g., the electronic device 101) and/or various applications (e.g., an application 370) executed in the OS. For example, the OS may be Android, iOS, Windows, Symbian, Tizen, Bada, and the like.

Referring to FIG. 3, the programming module 310 may include a kernel 320, a middleware 330, an API 360, and/or the application 370.

The kernel 320 (e.g., the kernel 141) may include a system resource manager 321 and/or a device driver 323. The system resource manager 321 may include, for example, a process manager (not illustrated), a memory manager (not illustrated), and a file system manager (not illustrated). The system resource manager 321 may perform the control, allocation, recovery, and/or the like of system resources. The device driver 323 may include, for example, a display driver (not illustrated), a camera driver (not illustrated), a BT driver (not illustrated), a shared memory driver (not illustrated), a USB driver (not illustrated), a keypad driver (not illustrated), a Wi-Fi driver (not illustrated), and/or an audio driver (not illustrated). Also, according to an embodiment of the present disclosure, the device driver 323 may include an inter-process communication (IPC) driver (not illustrated).

The middleware 330 may include multiple modules previously implemented so as to provide a function used in common by the applications 370. Also, the middleware 330 may provide a function to the applications 370 through the API 360 in order to enable the applications 370 to efficiently use limited system resources within the electronic device. For example, as illustrated in FIG. 3, the middleware 330 (e.g., the middleware 143 shown in FIG. 1) may include at least one of a runtime library 335, an application manager 341, a window manager 342, a multimedia manager 343, a resource manager 344, a power manager 345, a database manager 346, a package manager 347, a connectivity or connection manager 348, a notification manager 349, a location manager 350, a graphic manager 351, a security manager 352, and any other suitable and/or similar manager.

The runtime library 335 may include, for example, a library module used by a complier, in order to add a new function by using a programming language during the execution of the application 370. According to an embodiment of the present disclosure, the runtime library 335 may perform functions which are related to input and output, the management of a memory, an arithmetic function, and/or the like.

The application manager 341 may manage, for example, a life cycle of at least one of the applications 370. The window manager 342 may manage GUI resources used on the screen. The multimedia manager 343 may detect a format used to reproduce various media files and may encode or decode a media file through a codec appropriate for the relevant format. The resource manager 344 may manage resources, such as a source code, a memory, a storage space, and/or the like of at least one of the applications 370.

The power manager 345 may operate together with a basic input/output system (BIOS), may manage a battery or power, and may provide power information and the like used for an operation. The database manager 346 may manage a database in such a manner as to enable the generation, search and/or change of the database to be used by at least one of the applications 370. The package manager 347 may manage the installation and/or update of an application distributed in the form of a package file.

The connectivity manager 348 may manage a wireless connectivity such as, for example, Wi-Fi and Bluetooth (BT). The notification manager 349 may display or report, to the user, an event such as an arrival message, an appointment, a proximity alarm, and the like in such a manner as not to disturb the user. The location manager 350 may manage location information of the electronic device. The graphic manager 351 may manage a graphic effect, which is to be provided to the user, and/or a user interface related to the graphic effect. The security manager 352 may provide various security functions used for system security, user authentication, and the like. According to an embodiment of the present disclosure, when the electronic device (e.g., the electronic device 101) has a telephone function, the middleware 330 may further include a telephony manager (not illustrated) for managing a voice telephony call function and/or a video telephony call function of the electronic device.

The middleware 330 may generate and use a new middleware module through various functional combinations of the above-described internal element modules. The middleware 330 may provide modules specialized according to types of OSs in order to provide differentiated functions. Also, the middleware 330 may dynamically delete some of the existing elements, or may add new elements. Accordingly, the middleware 330 may omit some of the elements described in the various embodiments of the present disclosure, may further include other elements, or may replace the some of the elements with elements, each of which performs a similar function and has a different name.

The API 360 (e.g., the API 145) is a set of API programming functions, and may be provided with a different configuration according to an OS. In the case of Android or iOS, for example, one API set may be provided to each platform. In the case of Tizen, for example, two or more API sets may be provided to each platform.

The applications 370 (e.g., the applications 147) may include, for example, a preloaded application and/or a third party application. The applications 370 (e.g., the applications 147 shown in FIG. 1) may include, for example, a home application 371, a dialer application 372, a short message service (SMS)/multimedia message service (MMS) application 373, an Instant Message (IM) application 374, a browser application 375, a camera application 376, an alarm application 377, a contact application 378, a voice dial application 379, an electronic mail (e-mail) application 380, a calendar application 381, a media player application 382, an album application 383, a clock application 384, and any other suitable and/or similar application.

At least a part of the programming module 310 may be implemented by instructions stored in a non-transitory computer-readable storage medium. When the instructions are executed by one or more processors (e.g., the one or more processors 210), the one or more processors may perform functions corresponding to the instructions. The non-transitory computer-readable storage medium may be, for example, the memory 230. At least a part of the programming module 310 may be implemented (e.g., executed) by, for example, the one or more processors 210. At least a part of the programming module 310 may include, for example, a module, a program, a routine, a set of instructions, and/or a process for performing one or more functions.

Names of the elements of the programming module (e.g., the programming module 310) according to an embodiment of the present disclosure may change depending on the type of OS. The programming module according to an embodiment of the present disclosure may include one or more of the above-described elements. Alternatively, some of the above-described elements may be omitted from the programming module. Alternatively, the programming module may further include additional elements. The operations performed by the programming module or other elements according to an embodiment of the present disclosure may be processed in a sequential method, a parallel method, a repetitive method, or a heuristic method. Also, some of the operations may be omitted, or other operations may be added to the operations.

Figure 4:
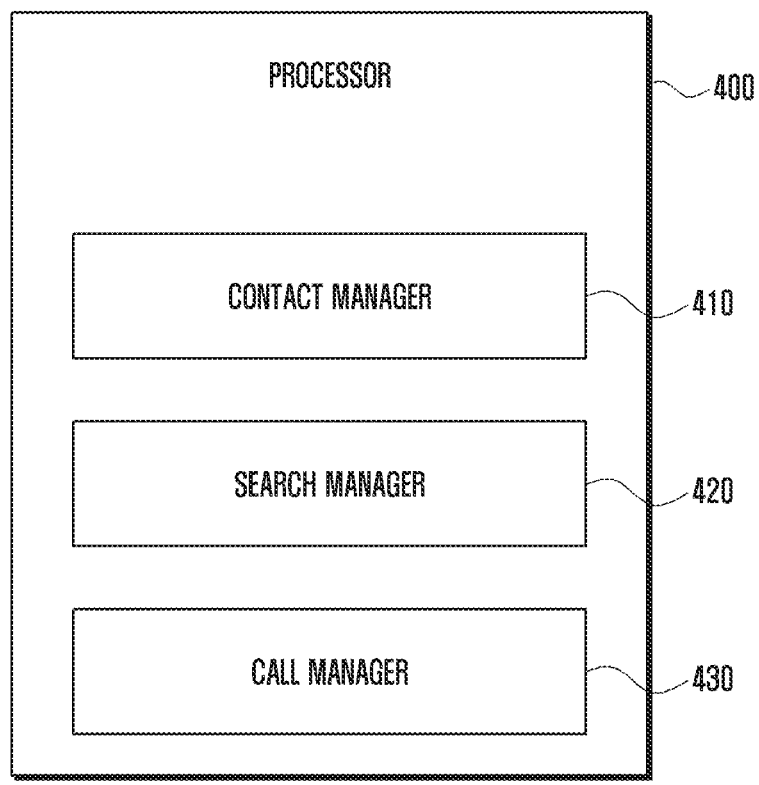
FIG. 4 illustrates a configuration of the processor shown in FIG. 2 according to an embodiment of the present disclosure.

FIG. 4 is a block diagram illustrating a configuration of the processor 400 according to an embodiment of the present disclosure.

Referring to FIG. 4, the processor 400 may correspond to, for example, the processor 120 shown in FIG. 1. The processor 400 may control the call handling function. Here, the call handling function may include phonebook display, contact search, and call placement. When a contact of a counterpart stored in the phonebook is changed, the call handling function may obtain a new contact of the counterpart from an external electronic device (e.g. first external electronic device 102, second external electronic device 104, or server 106, shown in FIG. 1), store the new contact, and display the newly stored contact so that it is readily distinguished from other contacts, thereby enhancing user convenience.

Displaying a newly changed or stored contact of a counterpart so that it is readily distinguished from other contacts may be applied when the phonebook is displayed, when a contact is searched, and when a call is placed.

In the following description, "first contact information" refers to a contact of a counterpart already stored in the electronic device, and "second contact information" refers to a newly changed contact of the counterpart. The second contact information is the current contact enabling communication with the counterpart. For example, the second contact information of a counterpart may be a contact or email address enabling communication with the counterpart at present. For ease of description, the external electronic device is regarded as the server 106. However, in the present disclosure, the external electronic device is not limited to the server 106. For example, the external electronic device may be a portable electronic device associated with a particular counterpart. When the external electronic device is the server 106, the server 106 may be an application server (AS) for executing a function of an application installed in the electronic device. The server 106 may also be a service capability server (SCS) for transmitting messages, data, and multimedia data for groups of electronic devices in the operator network. The server 106 may also be an email server.

During the call handling function, in response to a phonebook browse event, the second contact information may be displayed so that it is distinguished from other contacts (e.g. first contact information). As such, the user may easily identify the current contact enabling communication with a particular counterpart.

During the call handling function, in response to a contact search event, not only first contact information but also second contact information may be searched and the second contact information may be displayed so that it is distinguished from other contacts. As such, the user, who does not know that the contact of a particular counterpart is changed, may use the existing phone number to thereby find the current contact enabling communication with the counterpart.

During the call handling function, in response to a call placement event, the contact used by the user for call placement may be replaced with second contact information, thereby placing a call using the second contact information. As such, the user, who does not know that the contact of a counterpart is changed, may place a call to the counterpart using the existing phone number. That is, the call to the existing contact may be replaced with a call to the current contact enabling communication with the counterpart.

Referring to FIG. 4, to provide the call handling function, the processor 400 may include a contact manager 410, a search manager 420, and a call manager 430.

The contact manager 410 may check whether there is a change in the contacts of counterparts registered through the communication module (e.g. communication module 220) in the phonebook, and may store second contact information of a specific counterpart received through the communication module 220 from the server (e.g. server 106 shown in FIG. 1) in the memory (e.g. memory 130 shown in FIG. 1). The whole or a portion of the memory 130 may be embedded in the processor 400.

The contact manager 410 may replace stored first contact information of a counterpart with second contact information. The contact manager 410 may also store the second contact information of the counterpart in addition to the first contact information. Here, the contact manager 410 may designate the second contact information as a representative of contacts of the counterpart.

In response to a phonebook browse event, the contact manager 410 may control the display (e.g. display 160 shown in FIG. 1) to display the phonebook stored in the memory 130 in such a manner that elements of second contact information are distinguished from those of first contact information.

The processor 400 may control the display 160 to display second contact information in a highlighted manner Specifically, the processor 400 may control the display 160 to apply an emphasizing effect related to, for example, font, size, color, or icon to the second contact information. For a particular counterpart, the processor 400 may control the display 160 to display the second contact information at the top of the list of contacts of the counterpart.

The search manager 420 may control the display 160 to display contacts matching a search term in response to a contact search event. Here, for example, the search term may be the last part of a contact, the initial letter of a counterpart name, the family name of a counterpart, or a voice fragment for voice search.

The search manager 420 may identify the counterpart matching the search term. The search manager 420 may control the display 160 to display contacts of the counterpart matching the search term, if second contact information is present among the contacts, so that the second contact information is distinguished from the first contact information.

When the search term is the last part of a phone number, the search manager 420 may control the display 160 (shown in FIG. 1) to display the second contact information although the last part of the second contact information is not identical to the last part of the search term. That is, when the search term can specify a particular counterpart without an exact match, the search manager 420 may output the second contact information of the counterpart.

The call manager 430 may control the communication module 220 to make a call to a counterpart in response to a call placement event. In one embodiment of the present disclosure, if second contact information is present among the contacts of the counterpart, the call manager 430 may control the communication module 220 to make a call using the second contact information. Here, upon reception of a request for call connection to a particular counterpart, the call manager 430 may control the communication module 220 to make a call using a new contact of the counterpart regardless of the phone number entered by the user.

At the occurrence time of a call placement event, the call manager 430 may examine the type of a contact (e.g. mobile phone number) entered by the user. If the contact entered by the user is not of a given type, the call manager 430 may control the communication module 220 to make a call to the contact entered by the user.

This may provide user convenience as follows. Most persons have multiple contacts such as mobile phone number, home phone number, business phone number, and email address. Among the above contacts, the mobile phone number tends to change most frequently. Hence, in one embodiment of the present disclosure, if the contact entered by the user is of a given type (i.e. mobile phone number), the call may be placed using second contact information; and if the contact entered by the user is not of the given type, the call may be placed using the contact entered by the user. Thereby, it is possible to reduce unnecessary operations of the electronic device and to enhance user convenience.

With reference to FIGS. 1 and 4, when the second contact information is an international number, the call manager 430 may control the display 160 to display a confirmation notification for an international call before call placement using the second contact information.

The memory 130 may store an operating system (OS) of the electronic device (e.g. electronic device 101) and may further store application programs needed for optional functions, such as audio playback, image or moving image playback, broadcast reception, Internet access, text messaging, gaming, and road navigation. The memory 130 may store various types of data such as moving image data, game data, movie data, and map data. The memory 130 may also store a phonebook for the call handling function of the electronic device 101.

The display 160 may output various screens, such as home screen, menu screen, lock screen, gaming screen, webpage screen, call handling screen, and music or moving image playback screen, in the course of operating the electronic device 101 under the control of the processor 400.

The display 160 may output screens for the call handling function of the electronic device 101 (e.g. phonebook screen, contact search screen, and call placement screen) under the control of the processor 400. The display 160 may display second contact information so that it is distinguished from first contact information under the control of the processor 400.

The touch panel (e.g. touch panel 252 shown in FIG. 2) may sense touch input for controlling the call handling function. For example, the touch panel 252 may sense touch input for browsing the phonebook. The touch panel 252 may sense touch input for searching for a contact. The touch panel 252 may also sense touch input for confirming a call notification. Here, the call notification may be a notification reminding the user that the contact under consideration is an international number.

In one embodiment of the present disclosure, the electronic device 101 may be a smartphone having multiple subscriber identity cards capable of selectively accessing multiple mobile communication networks of different mobile operators. The electronic device 101 may be a smartphone having multiple card slots for installing multiple subscriber identity cards. Alternatively, the electronic device 101 may be a smartphone having an embedded universal integrated circuit card (UICC) without use of slots for installing and removing subscriber identity cards, and may download and install multiple pieces of subscriber identity card information of different mobile operators. Accordingly, the user may have multiple profiles and contacts corresponding to the different subscriber identity cards and, if necessary, may select one of the installed subscriber identity cards to thereby change the contact in use. Here, in response to a profile change event, the communication module 220 may send a contact associated with the changed profile to the server 106. The contact sent to the server 106 may be forwarded to the electronic device 101 having sent a contact change notification request.

The communication module 220 may send a contact change notification request for a specific counterpart to the server 106 under the control of the processor 400. The communication module 220 may receive a newly changed contact of the counterpart from the server 106. The communication module 220 may receive information on the location and country where the counterpart is currently present.

The audio module (e.g. audio module 280) may output a sound notification for controlling the call handling function through the speaker (e.g. speaker 282).

Hereinafter, a detailed description is given of the electronic device and calling handling method thereof according to various embodiments of the present disclosure.

Figure 5:
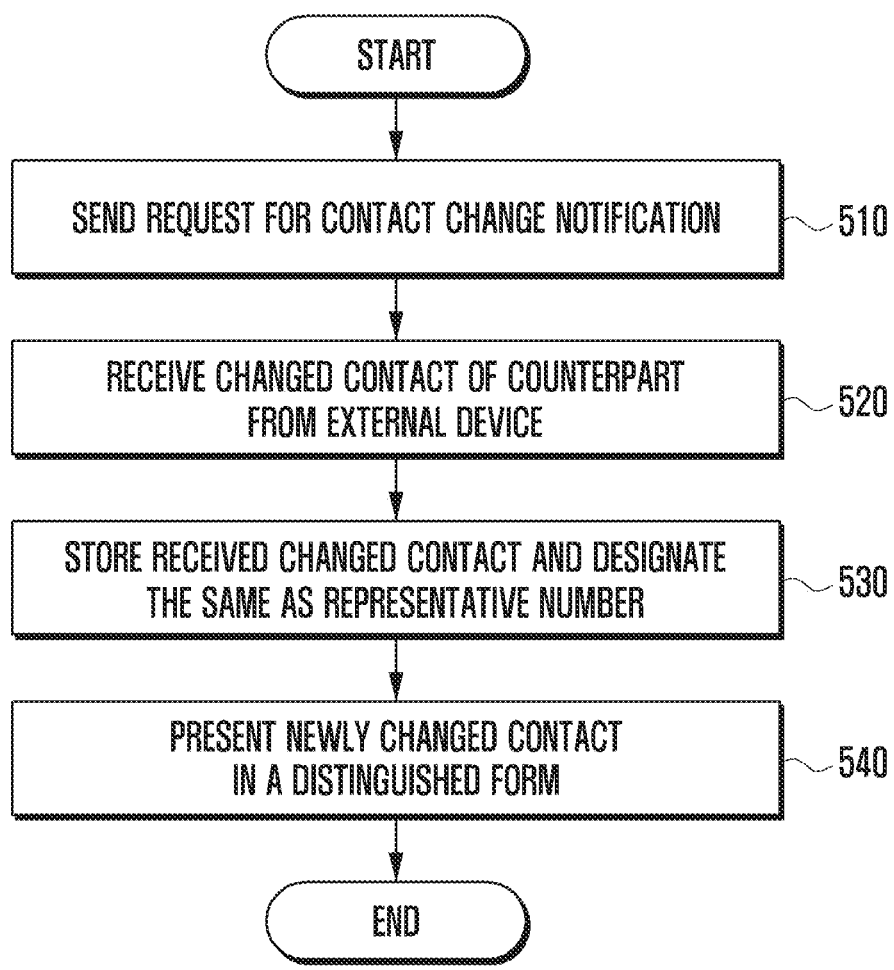
FIG. 5 is a flowchart of a procedure for a call control function of the electronic device according to an embodiment of the present disclosure.

FIG. 5 is a flowchart of a procedure for a call control function of the electronic device according to an embodiment of the present disclosure.

Figure 6:
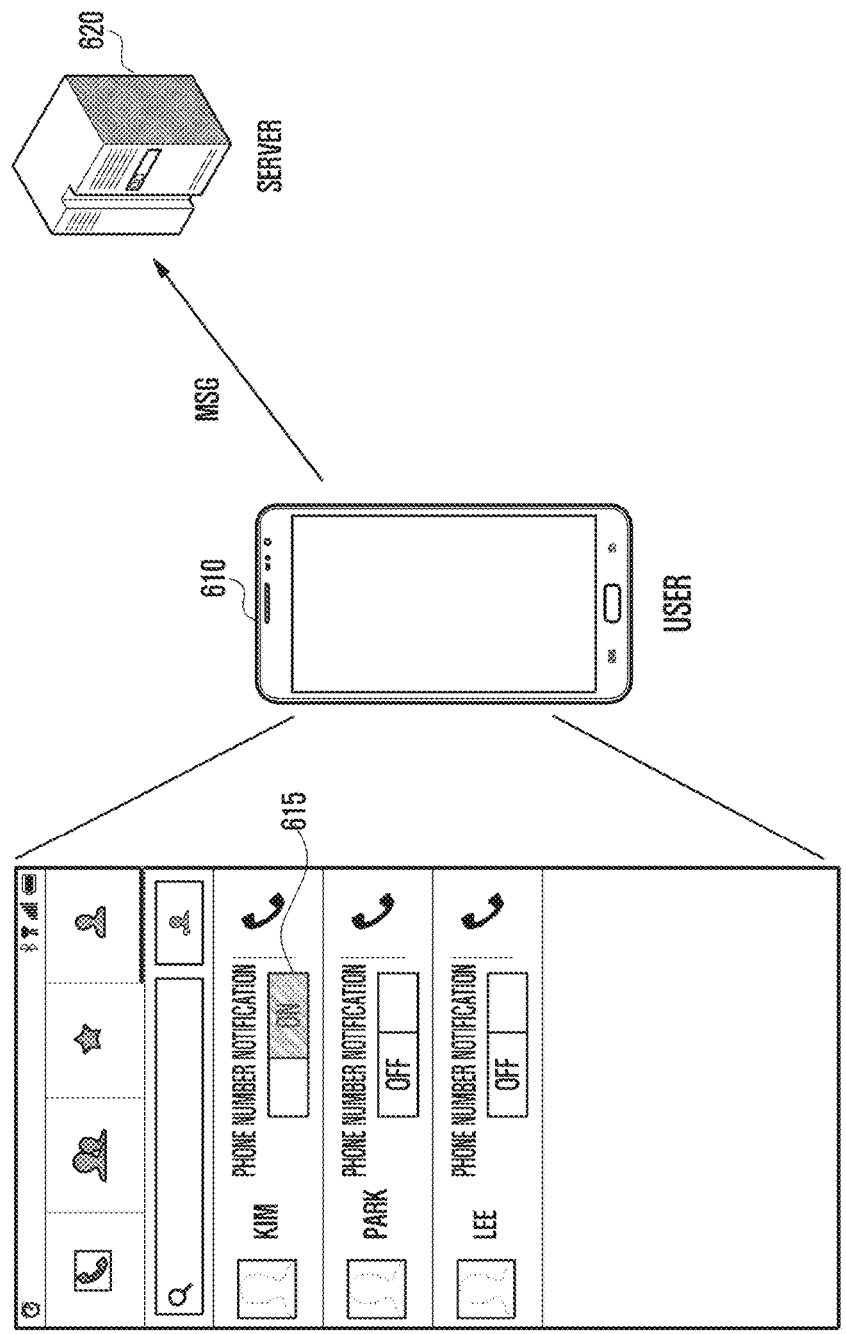
FIG. 6 is a screen representation for requesting a contact change notification according to an embodiment of the present disclosure.

FIG. 6 is a screen representation for requesting a contact change notification according to an embodiment of the present disclosure.

Figure 7:
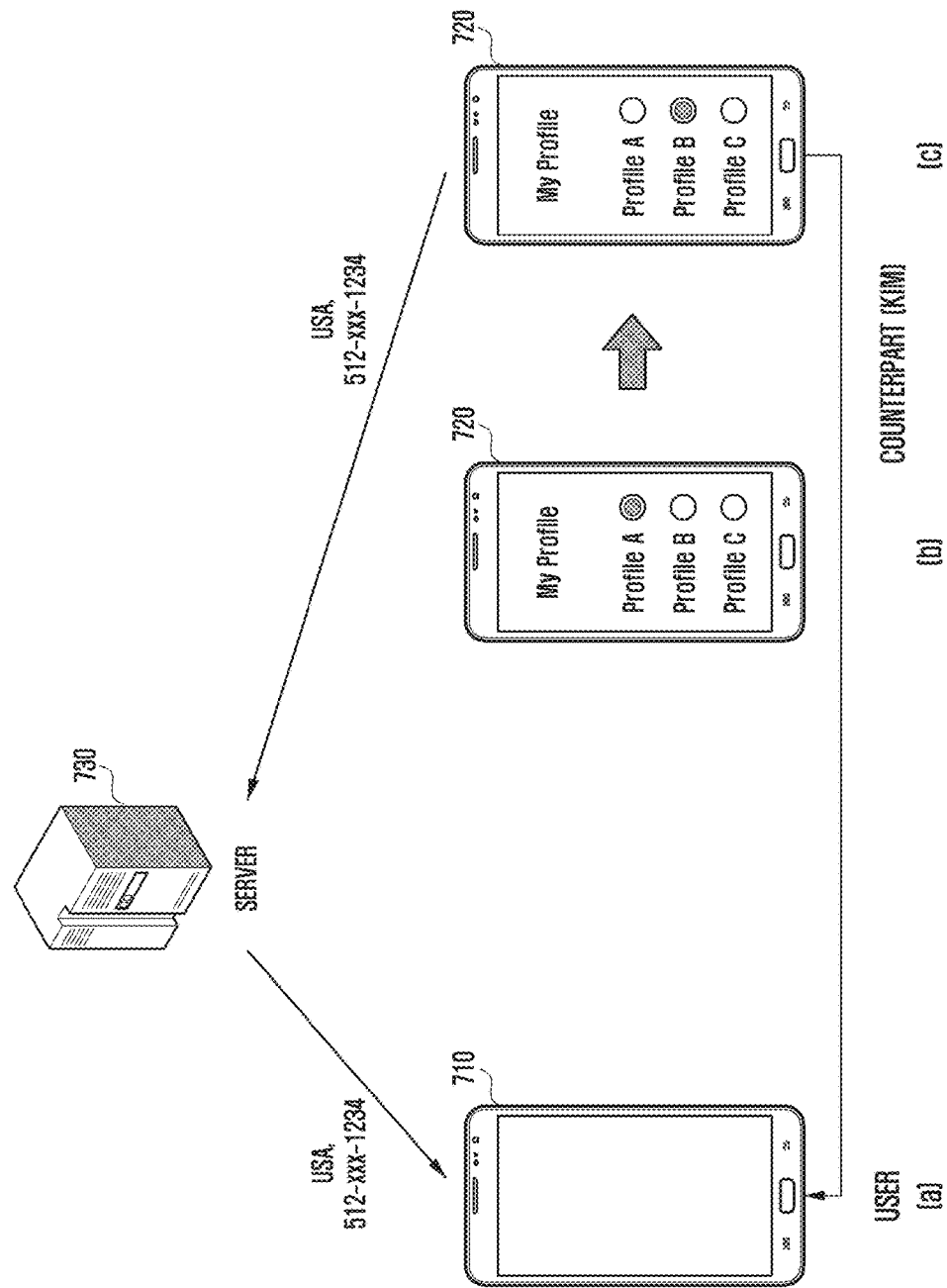
FIG. 7 illustrates reception of a changed contact of a counterpart according to an embodiment of the present disclosure.

FIG. 7 illustrates reception of a changed contact of a counterpart according to an embodiment of the present disclosure.

Figure 8:
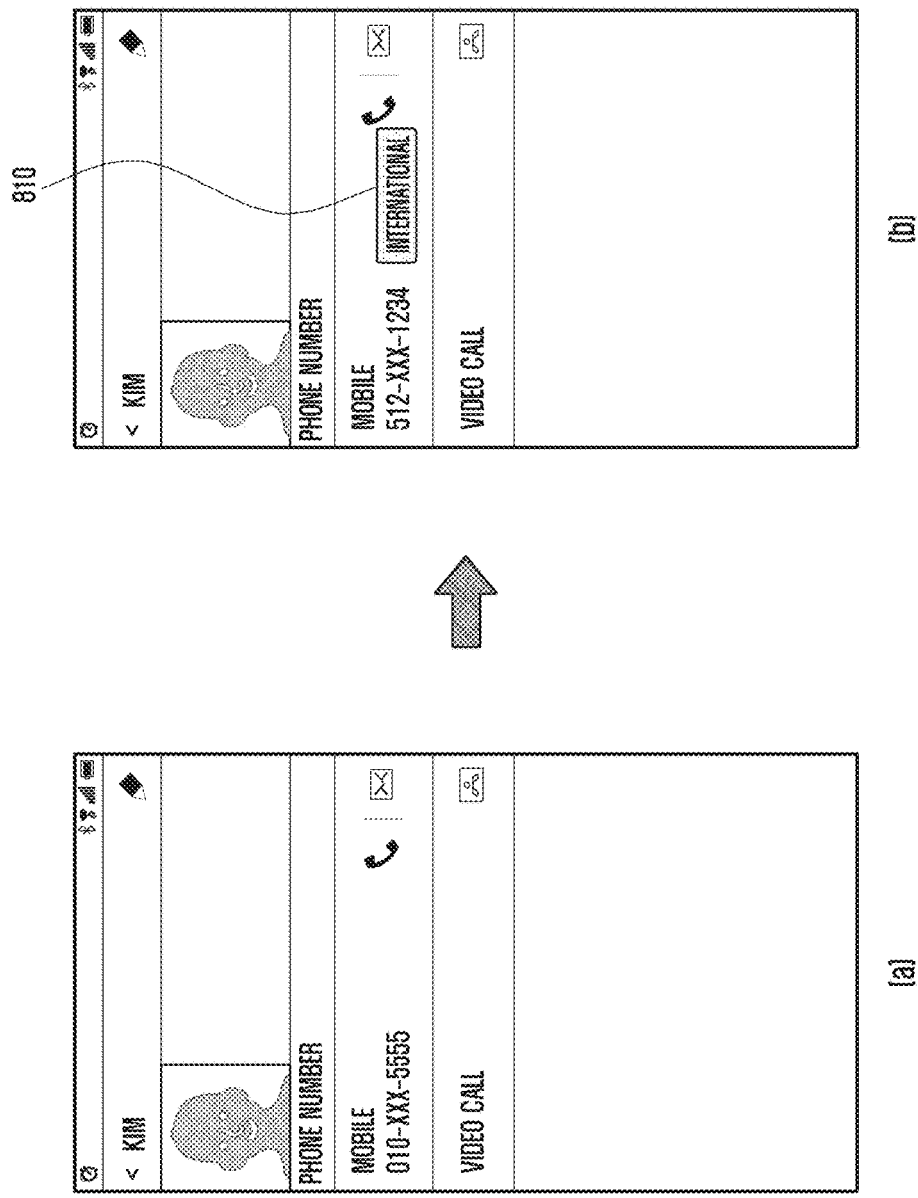
FIG. 8 illustrates display of a changed contact of a counterpart in the phonebook according to an embodiment of the present disclosure.

FIG. 8 illustrates display of a changed contact of a counterpart in the phonebook according to an embodiment of the present disclosure.

Figure 9:
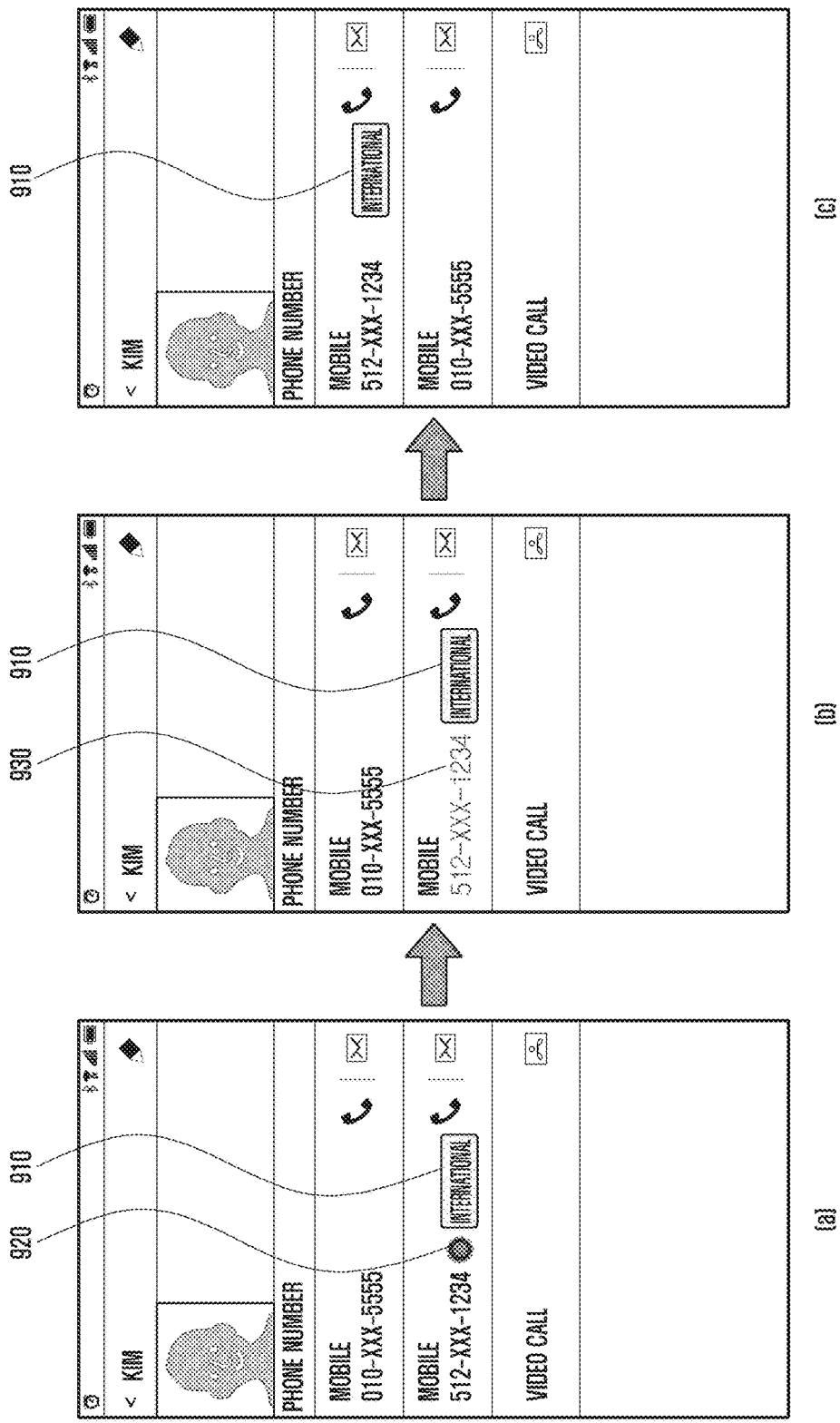
FIG. 9 illustrates display of a changed contact of a counterpart in the phonebook according to another embodiment of the present disclosure.

FIG. 9 illustrates another display of a changed contact of a counterpart in the phonebook according to an embodiment of the present disclosure.

A detailed description is given of the call handling function of the electronic device with reference to FIGS. 5 to 9.

Referring to FIG. 5, at operation 510, the processor 400 (e.g. contact manager 410 shown in FIG. 4) may receive a request for counterpart contact management from the user and then, the processor 400 may activate a contact change notification function for a specific counterpart.

Referring to FIG. 6, the contact change notification function may be activated by displaying a contact setting icon 615 on the phonebook screen of an electronic device 610 and touching the contact setting icon 615 for a particular counterpart.

The contact setting icon 615 may be assigned to each counterpart registered in the phonebook. Alternatively, the contact setting icon 615 may be assigned to all counterparts registered in the phonebook. As shown in FIG. 6, the contact setting icon 615 may be turned on or off by shifting it to the right or left on the screen.

The processor 400 may control the communication module (e.g. communication module 220 shown in FIG. 2) to send a contact change notification request for the selected counterpart to the external electronic device (e.g. server 106 shown in FIG. 1). The request sent to the server 106 may include a request for not only a changed contact of the counterpart but also information on the location or country where the counterpart is currently present.

Before sending a contact change notification request, the processor 400 may control the communication module to send identification information of the electronic device to the external electronic device. This enables the external electronic device to verify the validity of the electronic device. In this case, the electronic device may receive a changed contact of a particular counterpart from the external electronic device only after being authenticated by the external electronic device.

Referring to FIG. 5, at operation 520, the processor 400 controls the communication module (e.g. communication module 220 shown in FIG. 2) to receive a changed contact of the counterpart from the external electronic device.

Referring to FIG. 7, the electronic device 710 may receive not only a changed contact of the counterpart but also information on the country where the counterpart is currently present from the server 730.

Referring to FIG. 6, there are shown three counterparts "KIM", "PARK" and "LEE" registered in the phonebook and the contact change notification function is activated only for counterpart "KIM". Hence, FIG. 6 illustrates an example of activating the contact change notification function for counterpart "KIM" at operation 510 (shown in FIG. 5). In this case, upon activating the contact change notification function, under the control of the processor 400, the communication module may send the server 620 a message requesting the server 620 to receive a changed contact from the electronic device of counterpart "KIM". The electronic device of counterpart "KIM" may be of a type identical or similar to the type of the electronic device 101, the first external electronic device 102, or the second external electronic device 104 shown in FIG. 1.

When counterpart "KIM" changes the profile of the electronic device 720 from "profile A" to "profile B" as shown in parts (b) and (c) of FIG. 7, the electronic device 720 of counterpart "KIM" may send a contact associated with "profile B" to the server 730.

Then, as shown in part (a) of FIG. 7, the electronic device 710 of the user may receive the changed contact of counterpart "KIM" from the server 730 at operation 520. Here, the information, which is delivered from the electronic device 720 of counterpart "KIM" via the server 730 to the electronic device 710 of the user, may include not only the changed contact of counterpart "KIM" but also information on the location or country where counterpart "KIM" is currently present.

As indicated by the arrow from part (b) to part (a) of FIG. 7, the electronic device 710 of the user may receive changed contact information directly from the electronic device 720 of counterpart "KIM" through short-range communication (e.g. short-range communication 164). Here, the contact information associated with profile B of counterpart "KIM" may be sent directly to the electronic device 710 of the user without passing through the server 730. Short-range communication may be based on at least one of Wi-Fi, BT, BT Low Energy (BLE), ZigBee, NFC, magnetic secure transmission (MST), RF, and body area network (BAN).

At operation 530 (shown in FIG. 5), the processor 400 (e.g. contact manager 410 shown in FIG. 4) stores the received second contact information in the memory 230 and designates the same as a representative. That is, the contact manager 410 may designate the second contact information as a representative of contacts of the counterpart. The contact manager 410 may replace the first contact information of the counterpart stored in the memory 230 with the second contact information, or may store the second contact information separately from the first contact information.

For example, the contact manager 410 may store the second contact information of counterpart "KIM" received from the server 730 in the memory (e.g. memory 130 shown in FIG. 1) at operation 530. Here, as shown in part (a) of FIG. 8, the existing first contact information of counterpart "KIM" stored in the memory 130 is "010-XXX-5555". The contact manager 410 may replace the first contact information with the second contact information "512-XXX-1234" as shown in part (b) of FIG. 8. The contact manager 410 may designate the second contact information as a representative contact of counterpart "KIM" so that only the second contact information is displayed among contacts of counterpart "KIM". When the second contact information is an international number, to indicate this, the contact manager 410 may control the display 160 to output an international number notification icon 810 on the screen.

At operation 540 (shown in FIG. 5), the processor 400 (i.e. contact manager 410 shown in FIG. 4) presents the second contact information in a distinguished manner Specifically, in response to a phonebook browse event, the contact manager 410 may control the display 160 to display contacts of a counterpart stored in the memory 230 so that the second contact information is readily distinguished from the remaining contacts of the counterpart. In addition, the contact manager 410 may control the display 160 to display the second contact information so that it is readily distinguished from the remaining contacts of a counterpart in response to a contact search event.

For example, in response to a phonebook browse event, the processor 400 (e.g. contact manager 410 shown in FIG. 4) may control the display 160 to display all contacts of counterpart "KIM" so that the second contact information is highlighted at operation 540.

As shown in part (a) of FIG. 9, under the control of the processor 400, the display 160 may attach a highlight icon 920 to the second contact information among contacts of counterpart "KIM" to thereby indicate the representative or currently valid contact.

As another example, as shown in part (b) of FIG. 9, under the control of the processor 400, the display 160 may apply a highlight effect 930 (related to, e.g., font, size, or color) to the second contact information so that it is distinguished from the remaining first contact information of counterpart "KIM".

As another example, as shown in part (c) of FIG. 9, the display 160 may output the second contact information at the top of the contact list of counterpart "KIM". When the second contact information is an international number, the processor 400 may control the display 160 to attach an international number notification icon 910 to the second contact information on the screen.

Figure 10:
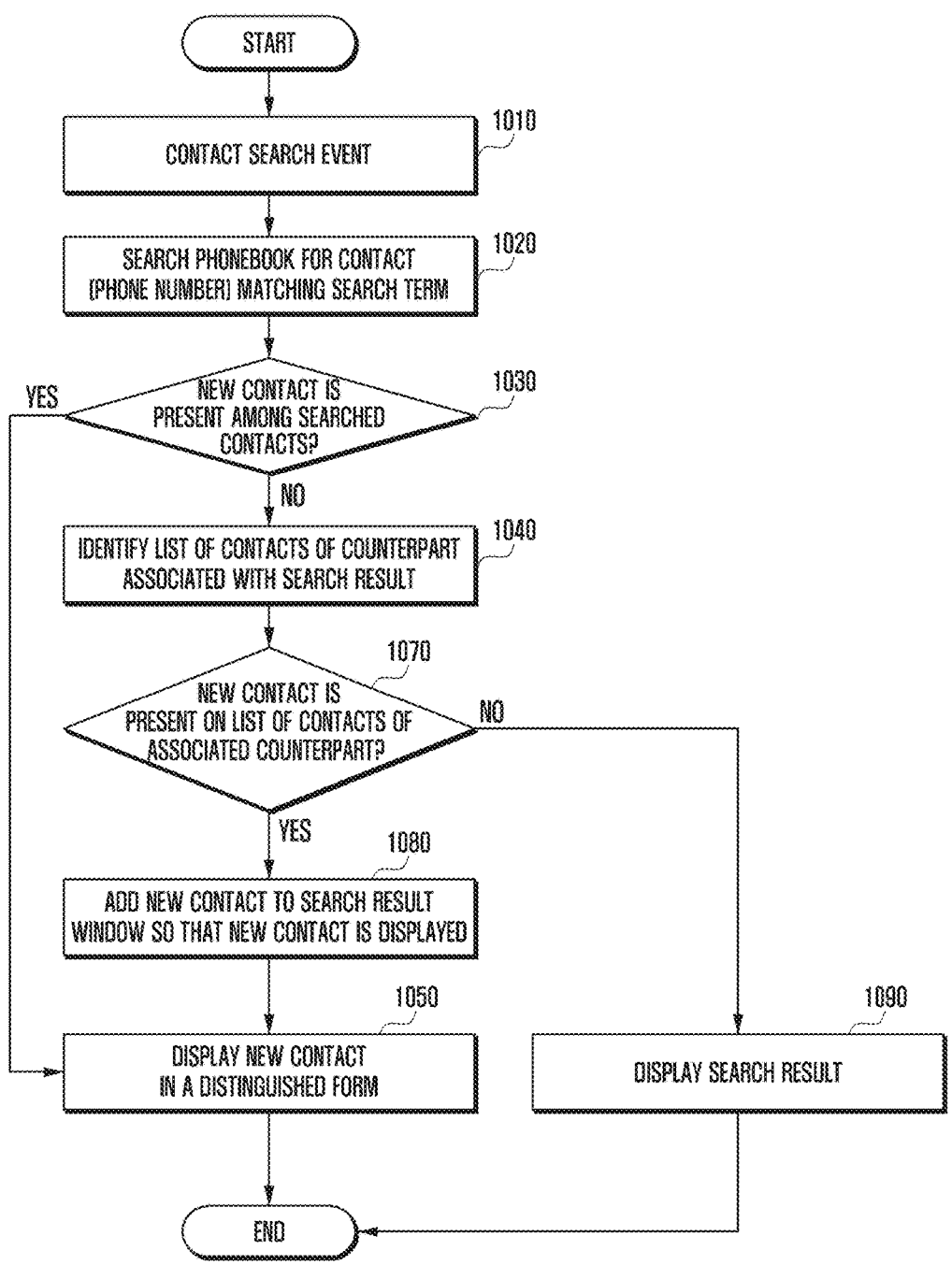
FIG. 10 is a flowchart of a procedure for a contact search function of the electronic device according to an embodiment of the present disclosure.

FIG. 10 is a flowchart of a procedure for a contact search function of the electronic device according to an embodiment of the present invention.

FIG. 11 is screen representations for a contact search in the electronic device according to an embodiment of the present disclosure.

A detailed description is given of the contact search function of the electronic device 101 with reference to FIGS. 10 and 11.

Referring to FIG. 10, at operation 1010, the processor 400 activates the contact search function. For example, referring to FIG. 11, the processor 400 may activate the contact search function in response to a touch on a numeral or letter key on the phonebook or keypad screen.

At operation 1020, in response to a contact search event, the processor 400 (e.g. search manager 420 shown in FIG. 2) searches the phonebook for a contact matching the search term. Here, the search term may be the last part of a contact, the initial letter of a counterpart name, the family name of a counterpart, or a voice fragment for voice search.

For example, as shown in part (a) of FIG. 11, to find the contact of counterpart "KIM", the user may enter last digits of the existing contact "5555" as a search term. Then, the search manager 420 may search the phonebook for a contact matching the input search term "5555".

At operation 1030, the processor 400 (e.g. search manager 420 shown in FIG. 4) checks whether second contact information is present among the contacts matching the input search term.

If second contact information is present, the procedure proceeds to operation 1050. At operation 1050, the processor 400 (e.g. search manager 420) controls the display 160 to display the second contact information matching the input search term so that it is distinguished from the remaining contacts matching the input search term.

For example, as shown in parts (b) and (c) of FIG. 11, when the user enters the initial letter of a counterpart name, the family name of a counterpart or a voice fragment as a search term, the processor 400 (e.g. search manager 420 shown in FIG. 4) may control the display 160 to display the second contact information of a counterpart matching the search term in a highlighted form as a search result. Here, the search manager 420 may display only the second contact information designated as the representative among the search results as shown in part (b) of FIG. 11. Alternatively, as shown in part (c) of FIG. 11, the search manager 420 may display the second contact information designated as the representative at the top of the list of search results. When the second contact information is an international number, the search manager 420 may control the display 160 to attach an international number notification icon 1110 to the second contact information 1120 on the screen. The search manager 420 may also control the display 160 to attach a highlight icon 1110 to the second contact information on the screen to thereby indicate that the second contact information is the representative or currently valid contact.

The scheme for highlighting the second contact information at operation 1050 may be identical to that described in connection with operation 540 of FIG. 5.

If second contact information is not present among the contacts matching the input search term, the procedure proceeds to operation 1040. At operation 1040, the processor 400 identifies the list of contacts of a counterpart matching the input search term in the phonebook. For example, if counterpart "KIM" has a contact matching the input search term (e.g. phone number's last digits "5555"), the search manager 420 may identify the contacts of counterpart "KIM".

At operation 1070, the search manager 420 checks whether second contact information is present on the list of contacts of the searched counterpart.

If second contact information is present on the list of contacts of the searched counterpart, the procedure proceeds to operation 1080. At operation 1080, the search manager 420 adds the second contact information to the list of search results so that the second contact information is output also on the display 160.

For example, as shown in part (b) of FIG. 11, although the search term is last digits "5555" and the second contact information of counterpart "KIM" includes "1234" as last digits, the second contact information of counterpart "KIM" ("512-XXX-1234") may be included in the list of search results.

If second contact information is not present on the list of contacts of the searched counterpart, the procedure proceeds to operation 1090. At operation 1090, the search manager 420 of the processor 400 controls the display 160 to output only the list of contacts matching the search term.

After operation 1090, the procedure may return to operation 1050. The scheme for highlighting the second contact information at operation 1050 may be identical to that described in connection with operation 540 of FIG. 5.

Figure 12:
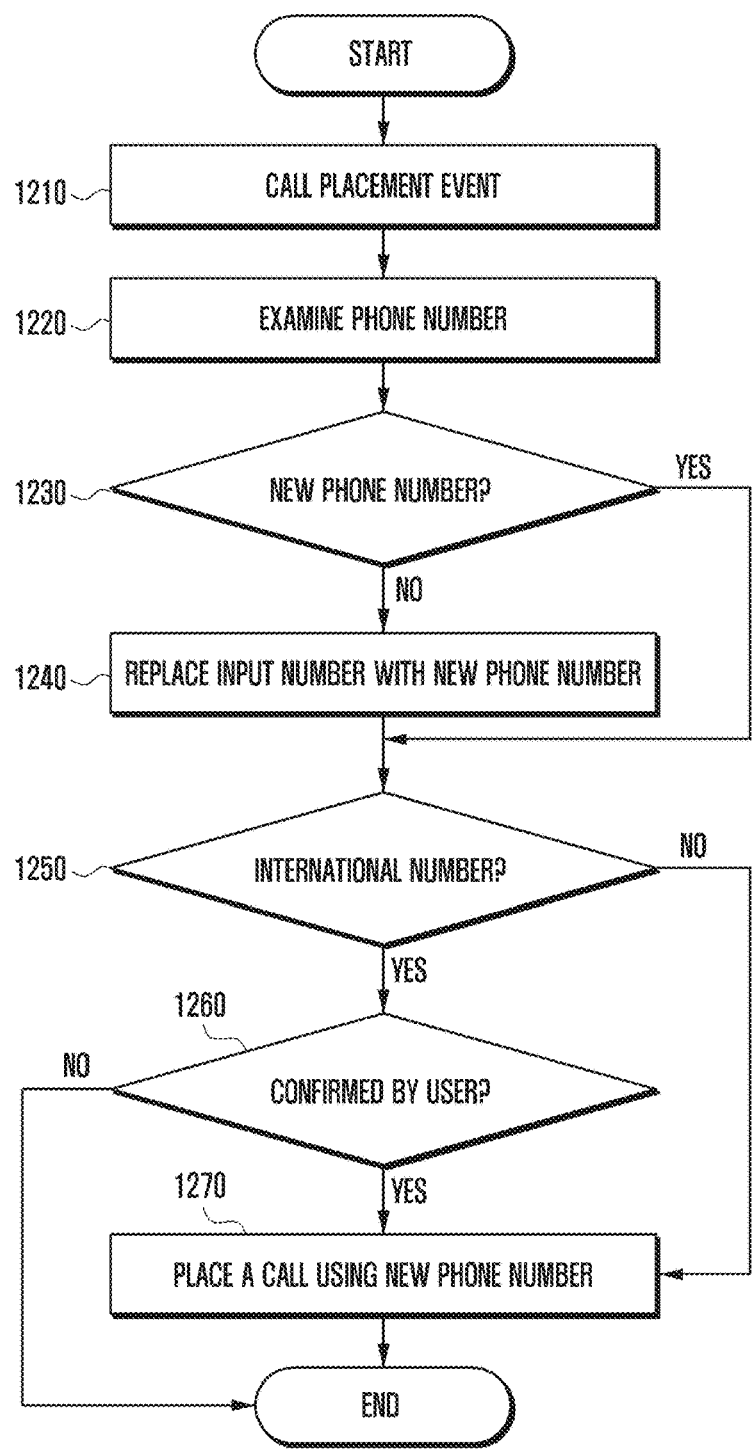
FIG. 12 is a flowchart of a procedure for a call placement function of the electronic device according to an embodiment of the present disclosure.

FIG. 12 is a flowchart of a procedure for a call placement function of the electronic device according to an embodiment of the present disclosure.

Figure 13:
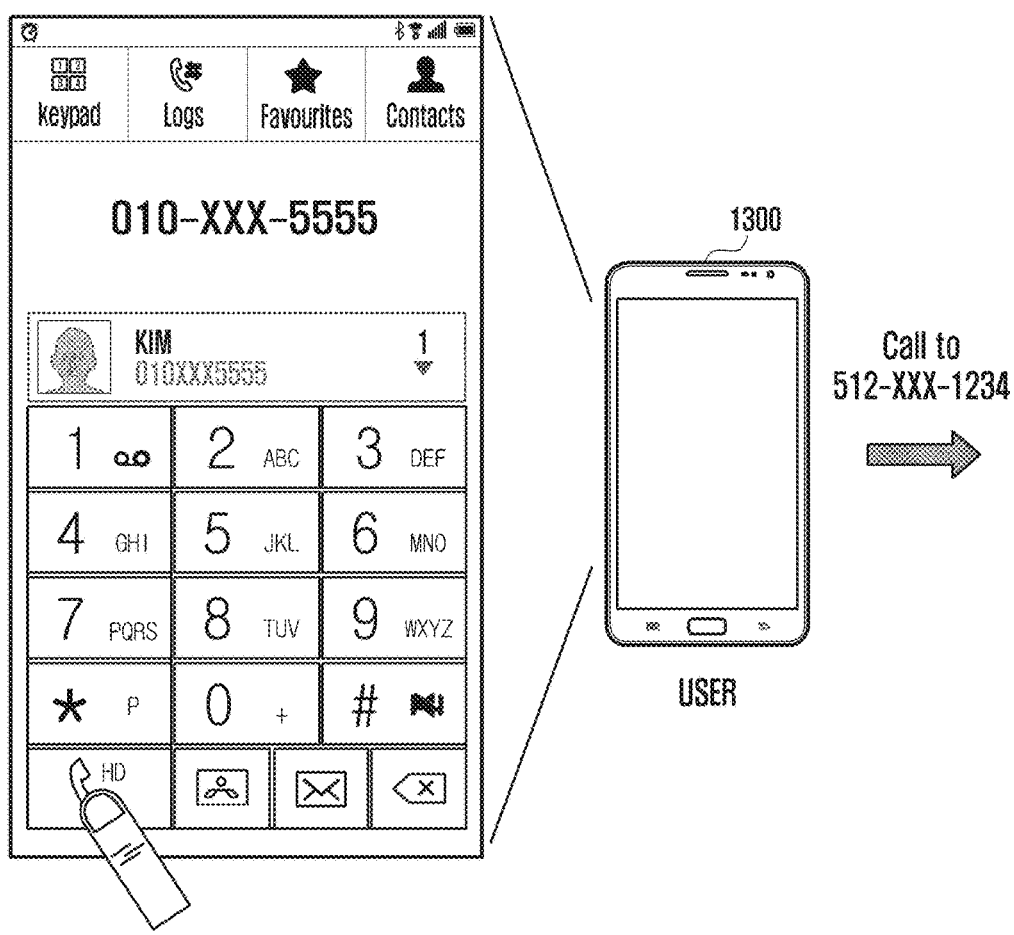
FIG. 13 is a screen representation for call placement in the electronic device according to an embodiment of the present disclosure.

FIG. 13 is a screen representation for call placement in the electronic device according to an embodiment of the present disclosure.

Figure 14:
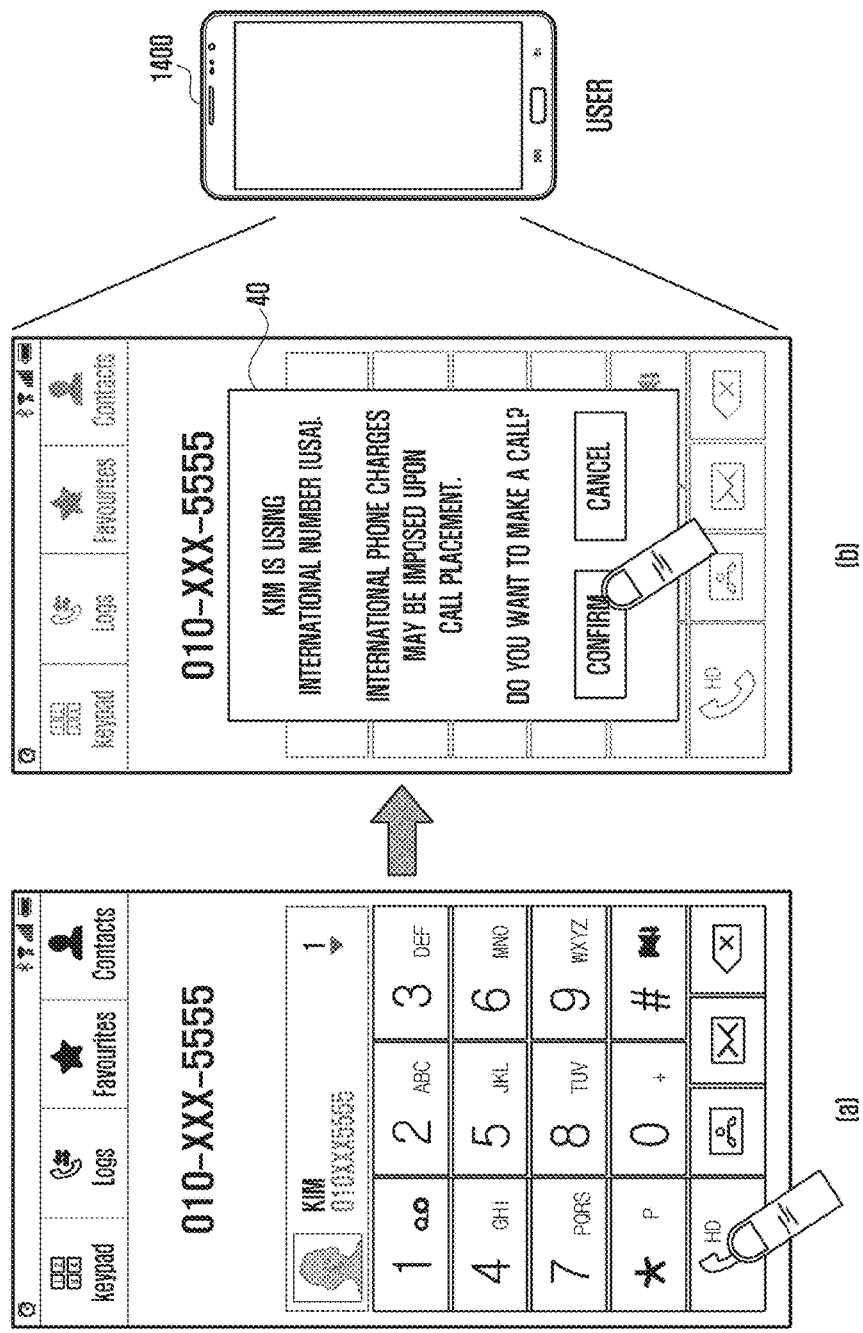
FIG. 14 is a screen representation for call placement in the electronic device according to an embodiment of the present disclosure.

FIG. 14 is another screen representation for call placement in the electronic device according to an embodiment of the present disclosure.

A detailed description is given of the call placement function of the electronic device 101 with reference to FIGS. 12, 13, and 14.

Referring to FIG. 12, at operation 1210, the processor 400 (shown in FIG. 4) activates the call placement function.

For example, referring to FIG. 13, the processor 400 may activate the call placement function in response to touch input on a call icon of the phonebook or keypad screen.

At operation 1220, in response to a call placement event, the call manager 430 of the processor 400 identifies the contact input or selected by the user for call placement.

At operation 1230, the call manager 430 of the processor 400 checks whether the input contact is second contact information.

If the input contact is second contact information, the procedure proceeds to operation 1250. At operation 1250, the call manager 430 of the processor 400 checks whether the input contact is an international number.

If the input contact is not second contact information, the procedure proceeds to operation 1240. At operation 1240, the call manager 430 of the processor 400 may replace the input contact with second contact information of the corresponding counterpart. For example, to make a call to counterpart "KIM", the user may enter or select the existing contact of counterpart "KIM". Then, referring to FIG. 13, although the existing contact "010-XXX-5555" is entered for call placement in the user's electronic device 1300, the call manager 430 may control the communication module 220 to place a call to counterpart "KIM" using "512-XXX-1234" as the second contact information.

After operation 1240, the procedure returns to operation 1250 described above.

If the input contact is an international number, the procedure proceeds to operation 1260. At operation 1260, the call manager 430 of the processor 400 controls the display 160 to output a notification for confirming placement of an international call on the screen.

For example, referring to FIG. 14, this confirmation notification may correspond to a window requesting the user to decide to either confirm or cancel placement of an international call.

If the user confirms placement of an international call, for example, at screen 40 of the user's electronic device 1400 (shown in parts (a) and (b) of FIG. 14), the procedure proceeds to operation 1270. At operation 1270, the call manager 430 controls the communication module 220 to make a call to the counterpart (e.g. counterpart "KIM") using the second contact information (e.g. "512-XXX-1234").

If the user cancels placement of an international call, the call manager 430 of the processor 400 ends the procedure.

Figure 15:
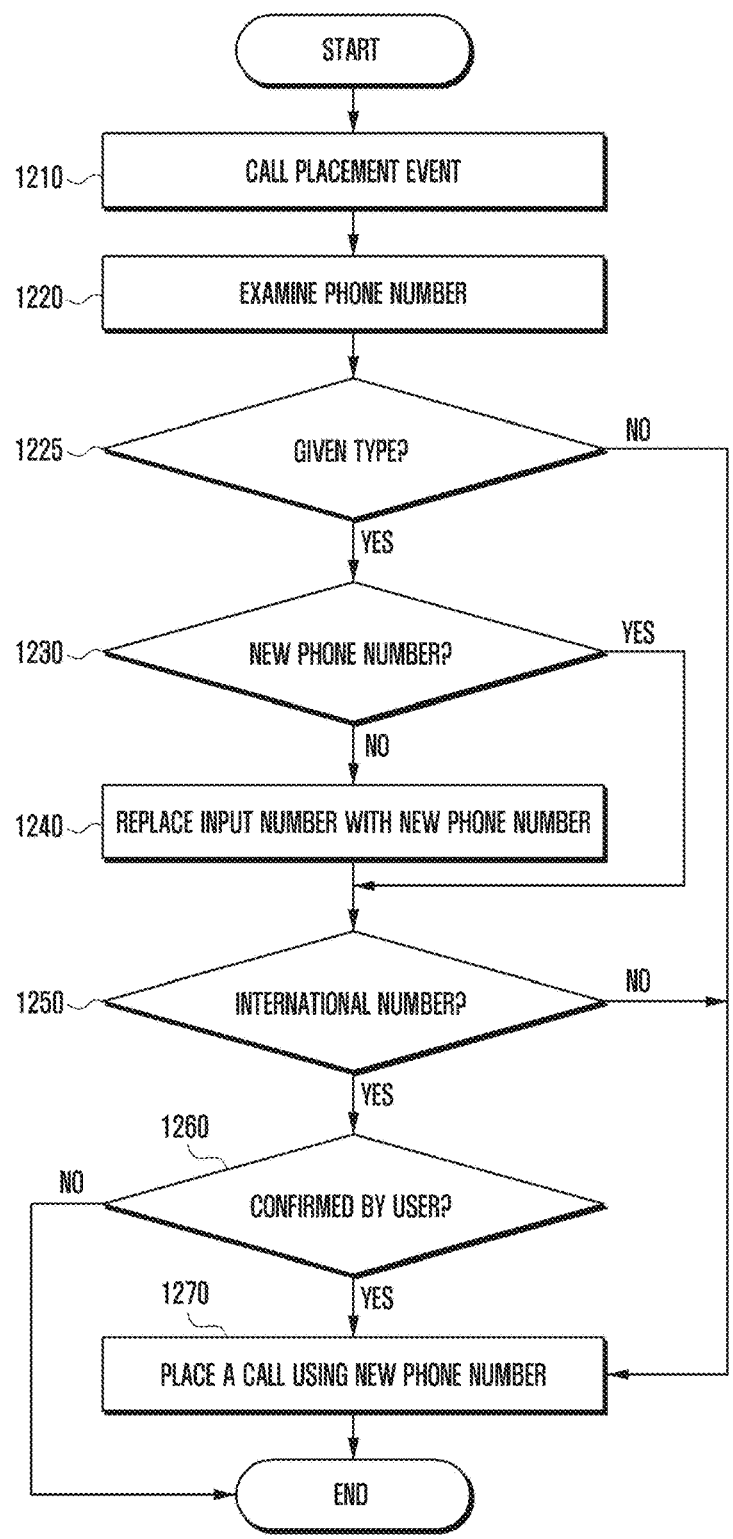
FIG. 15 is a flowchart of a procedure for a call placement function of the electronic device according to an embodiment of the present disclosure.

FIG. 15 is a flowchart of a procedure for a call placement function of the electronic device according to another embodiment of the present disclosure.

Referring to FIG. 15, the flowchart is generally identical to that of the flowchart of FIG. 12 except for operation 1225 inserted between operation 1220 and operation 1230. Hence, only operation 1225 of FIG. 15 is described and the description of the other operations is omitted herein.

At operation 1225, the call manager 430 of the processor 400 (shown in FIG. 4) checks whether the input contact for call placement is of a given type. For example, the call manager 430 may check whether the contact input by the user for call placement is a mobile phone number. This is because the mobile phone number tends to change frequently.

As described before, contacts may include a mobile phone number, home phone number, business phone number, and the like. Among the contacts, the mobile phone number tends to change most frequently. Hence, the call manager 430 may check the presence of second contact information only when the user makes a call using a mobile phone number.

If the input contact for call placement is of a given type, the procedure proceeds to operation 1230. If the input contact for call placement is not of the given type, the procedure proceeds to operation 1270. Operation 1230 and operation 1270 are described in connection with FIG. 12.

According to various embodiments of the present disclosure, when the user browses the phonebook, the changed contact of a counterpart can be displayed in such a manner that it is readily distinguishable from the other contacts. Hence, the user may readily identify the current contact for the counterpart.

When contacts are searched for a counterpart, first contact information of the counterpart can be found together with changed second contact information, and the second contact information may be displayed so that it is distinguished from the first contact information. Hence, the user, who does not know that the contact of a counterpart is changed, may use the existing phone number to find the current contact enabling communication with the counterpart.

In addition, when a call is placed to a counterpart whose contact is changed, the electronic device may replace the contact selected or entered by the user with the changed contact of the counterpart. Hence, the user, who does not know that the contact of a counterpart is changed, may place a call to the counterpart using the existing phone number.

A programming module according to embodiments of the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
a display;
a memory configured to store a first mobile number of a counterpart;
a transceiver; and
at least one processor configured to control for:
sending a request for a mobile number that the counterpart is currently using through the transceiver to an external electronic device in response to a user request,
receiving a second mobile number of the counterpart through the transceiver from the external electronic device, the second mobile number being a number currently used among a plurality of numbers used by the counterpart,
storing, by the memory, the second mobile number as a representative contact of the counterpart, and
displaying, by the display, the first mobile number and the second mobile number as contact information of the counterpart, and an object indicating that the second mobile number is the representative contact of the counterpart, the object being located adjacent to the second mobile number,
wherein a display attribute of the second mobile number is different from a display attribute of the first mobile number.

2. The electronic device of claim 1, wherein the at least one processor is further configured to control for:
storing, by the memory, the second mobile number so that the second mobile number is distinguished from the first mobile number.

3. The electronic device of claim 1, wherein, before the receiving of the second mobile number, the at least one processor is further configured to control for:
making a request to the external electronic device to notify the electronic device when a mobile number of the counterpart is changed.

4. The electronic device of claim 3, wherein, before the making of the request to the external device, the at least one processor is further configured to control for:
sending, by the transceiver, identification information of the electronic device to the external electronic device to thereby request the external electronic device to authenticate the electronic device.

5. The electronic device of claim 1, wherein the external electronic device comprises a server connected with the electronic device through a network or a portable electronic device of the counterpart.

6. The electronic device of claim 1,
wherein the at least one processor is further configured to control for:
searching a phonebook for contacts matching a search term entered by the user, and
outputting, by the display, a list of searched contacts; and
wherein, when the second mobile number is present on the list of searched contacts, the at least one processor is further configured to control for:
displaying, by the display, the second mobile number so that the second mobile number is distinguished from the first mobile number.

7. The electronic device of claim 6,
wherein, when the second mobile number is not present on the list of searched contacts, the at least one processor is further configured to control for identifying the counterpart associated with the search result; and
wherein, when the second mobile number is present on the list of contacts of the identified counterpart, the at least one processor is further configured to control for displaying, by the display, the second mobile number.

8. A method for providing contact information in an electronic device, the method comprising:
storing a first mobile number of a counterpart in a memory;
sending a request for a mobile number that the counterpart is currently using through a transceiver to an external electronic device in response to a user request;
receiving a second mobile number of the counterpart through the transceiver from the external electronic device, the second mobile number being a number currently used among a plurality of numbers used by the counterpart;
storing, by the memory, the second mobile number as a representative contact of the counterpart; and
displaying the first mobile number and the second mobile number as the contact information of the counterpart, and an object indicating that the second mobile number is the representative contact of the counterpart, the object being located adjacent to the second mobile number,
wherein a display attribute of the second mobile number is different from a display attribute of the first mobile number.

9. The method of claim 8, further comprising:
before receiving the second mobile number, making a request to the external electronic device to notify the electronic device when a mobile number of the counterpart is changed.

10. The method of claim 9, further comprising:
before making such a request, sending identification information of the electronic device to the external electronic device to thereby request the external electronic device to authenticate the electronic device.

11. The method of claim 8, further comprising:
searching a phonebook for contacts matching a search term entered by the user;
outputting a list of searched contacts on the display; and
displaying, when the second mobile number is present on the list of searched contacts, the second mobile number on the display so that the second mobile number is distinguished from the first mobile number.

12. The method of claim 11, further comprising:
identifying, when the second mobile number is not present on the list of searched contacts, the counterpart associated with the search result; and
displaying, when the second mobile number is present on the list of contacts of the identified counterpart, the second mobile number on the display.

13. The method of claim 8, further comprising:
identifying, when the user makes a call request for the counterpart, the mobile number entered by the user; and
making, when the input mobile number corresponds to the first mobile number, a call to the second mobile number.

14. A non-transitory computer-readable recording medium having recorded thereon at least one program comprising commands which, when executed by at least one processor, performs a method, the method comprising:
storing a first mobile number of a counterpart in a memory;
sending a request for a mobile number that the counterpart is currently using through a transceiver to an external electronic device in response to a user request;
receiving a second mobile number of the counterpart through the transceiver from the external electronic device, the second mobile number being a number currently used among a plurality of numbers used by the counterpart;
storing, by the memory, the second mobile number as a representative contact of the counterpart; and
displaying the first mobile number and the second mobile number as contact information of the counterpart, and an object indicating that the second mobile number is the representative contact of the counterpart, the object being located adjacent to the second mobile number,
wherein a display attribute of the second mobile number is different from a display attribute of the first mobile number.

* * * * *